(12) United States Patent
Breed et al.

(10) Patent No.: US 10,410,535 B2
(45) Date of Patent: Sep. 10, 2019

(54) SECURE TESTING DEVICE

(71) Applicant: Intelligent Technologies International, Inc., Miami Beach, FL (US)

(72) Inventors: David S Breed, Miami Beach, FL (US); Oleksandr Shostak, Kyiv (UA); Wilbur E DuVall, Katy, TX (US); Wendell C Johnson, San Pedro, CA (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 0 days.

(21) Appl. No.: 16/107,164

(22) Filed: Aug. 21, 2018

(65) Prior Publication Data

US 2018/0357916 A1 Dec. 13, 2018

Related U.S. Application Data

(63) Continuation-in-part of application No. 15/964,208, filed on Apr. 27, 2018, now abandoned, which is a
(Continued)

(51) Int. Cl.
*H04N 5/247* (2006.01)
*G09B 7/07* (2006.01)
(Continued)

(52) U.S. Cl.
CPC ........... *G09B 7/07* (2013.01); *G02B 27/0172* (2013.01); *G02B 27/0176* (2013.01);
(Continued)

(58) Field of Classification Search
CPC ..................................................... H04N 5/247
(Continued)

(56) References Cited

U.S. PATENT DOCUMENTS

| 4,593,384 A | 6/1986 | Kleijne |
| 5,565,316 A | 10/1996 | Kershaw et al. |

(Continued)

FOREIGN PATENT DOCUMENTS

| CN | 103108163 A | 5/2013 |
| CN | 103136510 A | 6/2013 |

(Continued)

OTHER PUBLICATIONS

Search Report and Written Opinion for International Application No. PCT/US2015/045846 dated Dec. 7, 2015.
(Continued)

*Primary Examiner* — Anand S Rao
(74) *Attorney, Agent, or Firm* — Brian Roffe

(57) ABSTRACT

Secure testing system including an eyeglass frame having a lens portion and a support portion extending rearward from the lens portion, a housing attached to one side of the frame, an assembly arranged in the housing, and a chassis intrusion detector arranged in conjunction with the housing to detect an attempt to intrude into the housing. The assembly includes a display oriented rearward, a cross-view camera oriented to image toward opposite side of the frame, at least one microphone arranged on the frame to detect sound in an environment around the frame, a biometric sensor arranged on the housing to obtain biometric data, and a processor that causes display of questions on the display, monitors images from the cross-view camera for changes indicative of a possibility of reception of assistance, monitors each microphone for sounds, and monitors the biometric sensor for a change in biometric data.

20 Claims, 15 Drawing Sheets

Related U.S. Application Data continuation of application No. 15/329,243, filed as application No. PCT/US2015/045846 on Aug. 19, 2015, now Pat. No. 9,959,777.

(60) Provisional application No. 62/668,965, filed on May 9, 2018, provisional application No. 62/644,897, filed on Mar. 19, 2018, provisional application No. 62/040,806, filed on Aug. 22, 2014.

(51) Int. Cl.
*G10L 17/00* (2013.01)
*G06K 9/00* (2006.01)
*G02B 27/01* (2006.01)

(52) U.S. Cl.
CPC ..... *G06K 9/00604* (2013.01); *G06K 9/00617* (2013.01); *G10L 17/005* (2013.01); *H04N 5/247* (2013.01); *G02B 2027/014* (2013.01); *G02B 2027/0138* (2013.01); *G02B 2027/0178* (2013.01)

(58) Field of Classification Search
USPC .................................................. 348/142–160
See application file for complete search history.

(56) References Cited

U.S. PATENT DOCUMENTS

| | | |
|---|---|---|
| 5,629,984 A | 5/1997 | McManis |
| 5,915,473 A | 6/1999 | Hoehn-Saric et al. |
| 5,947,747 A | 9/1999 | Walker et al. |
| 6,023,372 A | 2/2000 | Spitzer et al. |
| 6,320,610 B1 | 11/2001 | Van Sant et al. |
| 6,529,209 B1 | 3/2003 | Dunn et al. |
| 6,532,298 B1 | 3/2003 | Cambier et al. |
| 6,665,428 B1 | 12/2003 | Gozzini |
| 6,853,293 B2 | 2/2005 | Swartz et al. |
| 7,054,162 B2 | 5/2006 | Benson et al. |
| 7,069,586 B1 | 6/2006 | Winneg et al. |
| 7,257,557 B2 | 8/2007 | Hulick |
| 7,278,734 B2 | 10/2007 | Jannard et al. |
| 7,281,667 B2 | 10/2007 | Farooq et al. |
| 7,472,836 B2 | 1/2009 | Farooq et al. |
| 7,551,098 B1 | 6/2009 | Chock et al. |
| 7,758,911 B2 | 7/2010 | Heffner |
| 7,791,809 B2 | 9/2010 | Filipovich et al. |
| 7,792,552 B2 | 9/2010 | Thomas et al. |
| 7,806,341 B2 | 10/2010 | Farooq et al. |
| 8,020,220 B2 | 9/2011 | McElroy et al. |
| 8,020,989 B2 | 9/2011 | Jannard et al. |
| 8,165,347 B2 | 4/2012 | Heinzmann et al. |
| 8,203,502 B1 | 6/2012 | Chi et al. |
| 8,223,024 B1 | 7/2012 | Petron |
| 8,233,672 B2 | 7/2012 | Matos |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,649,530 B2 | 2/2014 | Kim et al. |
| 8,696,113 B2 | 4/2014 | Lewis |
| 8,713,130 B2 | 4/2014 | Logan et al. |
| 8,733,927 B1 | 5/2014 | Lewis |
| 8,733,928 B1 | 5/2014 | Lewis |
| 8,750,558 B2 | 6/2014 | Lee et al. |
| 8,814,691 B2 | 8/2014 | Haddick et al. |
| 9,202,443 B2 | 12/2015 | Perez et al. |
| 9,280,907 B2 | 3/2016 | Dorman |
| 9,928,510 B2 | 3/2018 | Matos |
| 9,984,582 B2 | 5/2018 | Logan et al. |
| 10,037,708 B2 | 7/2018 | Ming et al. |
| 2002/0186838 A1 | 12/2002 | Brandys |
| 2003/0009683 A1 | 1/2003 | Schwenck et al. |
| 2003/0009684 A1 | 1/2003 | Schwenck et al. |
| 2003/0059078 A1 | 3/2003 | Downs, Jr. et al. |
| 2004/0229199 A1 | 11/2004 | Ashley et al. |
| 2005/0201585 A1 | 9/2005 | Jannard et al. |
| 2007/0052672 A1 | 3/2007 | Ritter et al. |
| 2007/0117083 A1 | 5/2007 | Winneg et al. |
| 2008/0089545 A1 | 4/2008 | Jannard et al. |
| 2008/0285801 A1 | 11/2008 | Heinzmann et al. |
| 2009/0008459 A1 | 1/2009 | Mainguet |
| 2009/0097688 A1 | 4/2009 | Lewis |
| 2009/0231722 A1 | 9/2009 | Filipovich et al. |
| 2010/0182020 A1 | 7/2010 | Thornley et al. |
| 2010/0315720 A1 | 12/2010 | Filipovich et al. |
| 2011/0031982 A1 | 2/2011 | Leon et al. |
| 2011/0103585 A1 | 5/2011 | Tuck et al. |
| 2011/0169932 A1 | 7/2011 | Mula et al. |
| 2011/0197327 A1 | 8/2011 | McElroy et al. |
| 2011/0227603 A1 | 9/2011 | Leon et al. |
| 2011/0244440 A1 | 10/2011 | Saxon et al. |
| 2011/0279228 A1 | 11/2011 | Kumar |
| 2012/0062241 A1 | 3/2012 | Rossi et al. |
| 2012/0063046 A1 | 3/2012 | Rossi et al. |
| 2012/0068914 A1 | 3/2012 | Jacobsen et al. |
| 2012/0176220 A1 | 7/2012 | Garcia |
| 2013/0081127 A1 | 3/2013 | Chen |
| 2013/0127980 A1 | 5/2013 | Haddick et al. |
| 2013/0168683 A1 | 7/2013 | Perez et al. |
| 2013/0286053 A1 | 10/2013 | Fleck et al. |
| 2014/0085452 A1 | 3/2014 | Nistico et al. |
| 2014/0138447 A1 | 5/2014 | Goldman et al. |
| 2014/0267420 A1 | 9/2014 | Schowengerdt et al. |
| 2015/0193651 A1 | 7/2015 | Breed et al. |
| 2016/0035233 A1 | 2/2016 | Breed |
| 2016/0180170 A1 | 6/2016 | Auger et al. |
| 2016/0307455 A1 | 10/2016 | Dorman |
| 2017/0185805 A1 | 6/2017 | Breed et al. |
| 2018/0082474 A1 | 3/2018 | Vaughn et al. |

FOREIGN PATENT DOCUMENTS

| | | |
|---|---|---|
| EP | 1175498 B1 | 7/2005 |
| JP | 2009237801 A | 10/2009 |
| JP | 2017-156410 A | 9/2017 |
| WO | 2016028864 A1 | 2/2016 |

OTHER PUBLICATIONS

Search Report and Written Opinion for PCT/US2015/056710 dated Jan. 15, 2016.
Search report for International Application No. PCT/US19/22951 dated Jun. 7, 2019.
Written opinion for International Application No. PCT/US19/22951 dated Jun. 7, 2019.

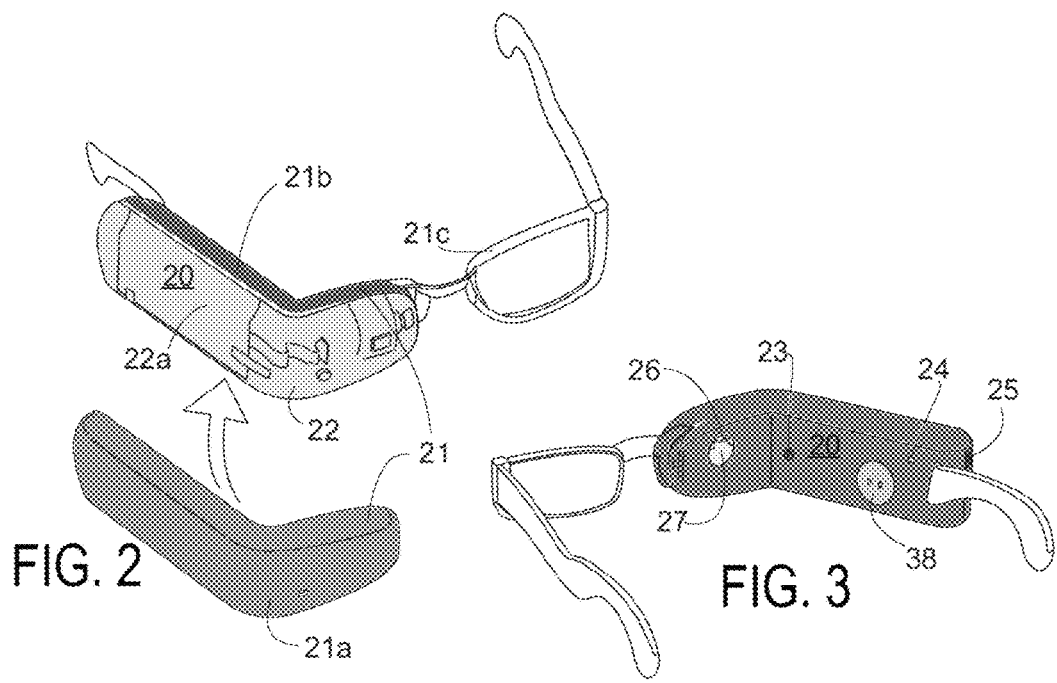
FIG. 2
FIG. 3
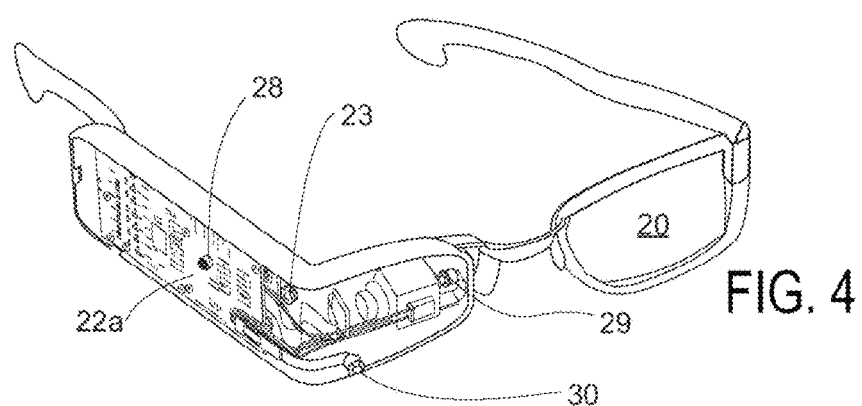
FIG. 4
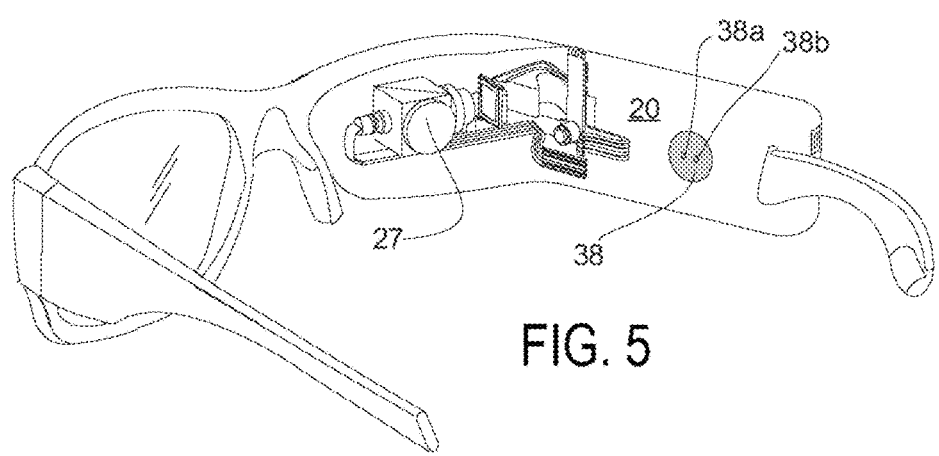
FIG. 5

FIG. 24
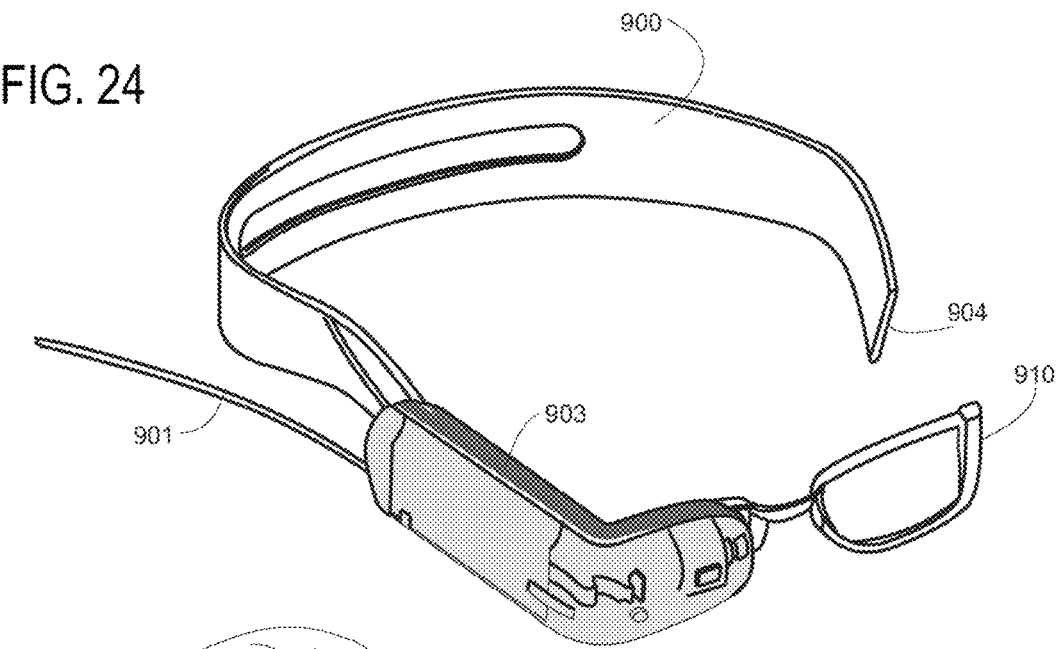
FIG. 25
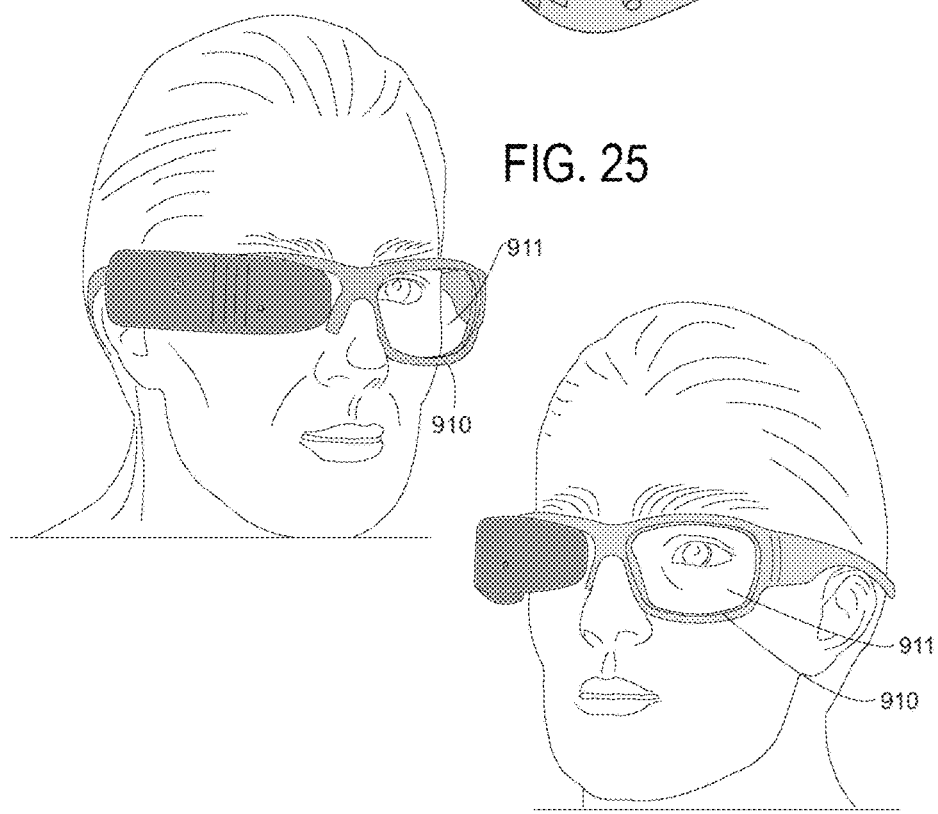
FIG. 26

SECURE TESTING DEVICE

CROSS REFERENCE TO RELATED APPLICATIONS

This application claims priority of U.S. provisional patent application Ser. Nos. 62/644,897 filed Mar. 19, 2018 and 62/668,965 filed May 9, 2018, and is a continuation-in-part of U.S. patent application Ser. No. 15/964,208 filed Apr. 27, 2018 which is a continuation of U.S. patent application Ser. No. 15/329,243 filed Jan. 25, 2017, now U.S. Pat. No. 9,959,777, which is a 371 of International Application No. PCT/US15/45846 filed Aug. 19, 2015, which claims priority of U.S. provisional patent application Ser. No. 62/040,806 filed Aug. 22, 2014, now expired, all of which are incorporated by reference herein.

FIELD OF THE INVENTION

The present invention relates generally to the field of a computer-based system and method for taking a test while ensuring that the test-taker is not receiving assistance from another person or otherwise cheating while taking the test and that a device used for displaying or taking the test has not been breached and is not being breached or otherwise compromised.

BACKGROUND OF THE INVENTION

There is significant discussion over the past several years relating to MOOCs, Massive Open Online Courses. Using the Internet, education can be freely distributed to anyone who has Internet access. Mastery of almost any field taught in colleges and universities can be achieved by a motivated student without attending lectures at that college or university. Thus, technology is in place for a student to obtain at virtually no cost the knowledge that has previously only been available to a campus-resident, matriculated student at a college, university or other institution.

In contrast, the cost of a traditional Massachusetts Institute of Technology (MIT) education, for example, resulting in a bachelor's degree can approach or exceed two hundred thousand dollars. The only impediment which exists from preventing a university such as MIT from granting a degree to an online-taught student is that the university needs to know with absolute certainty that the student did not cheat when taking various examinations required to demonstrate mastery of the coursework. With a degree from MIT, for example, industry will hire such a person at a starting salary approaching or exceeding $100,000 per year. Thus, the value to the student is enormous. Since the information which must be mastered is now available for free on the Internet, the main impediment separating a motivated and capable student from a high starting salary is that a degree-granting university must be certain that the student has demonstrated mastery of the material through successful completion of examinations without the assistance of a helper or consultant while taking the examinations.

Even when examinations are administered in a classroom, it is well known that extensive cheating can occur. In China, for example, where admission to college is solely determined by the score that a student receives on a one-time examination, motivation to cheat is enormous.

U.S. Pat. No. 5,565,316 (Kershaw et al.) describes a system and method for computer-based testing. A test development system produces a computerized test, and a test delivery system delivers the computerized test to an examinee's workstation. The method comprises producing a computerized test, delivering the computerized test to an examinee and recording examinee responses to questions presented to the examinee during the delivery of the computerized test. A method of delivering a computerized test is also provided in which a standardized test is created, an electronic form of the test is then prepared, the items of the test are presented to an examinee on a workstation display and the examinee's responses are accepted and recorded. A method of administering a computerized test is further provided in which a computerized test is installed on a workstation and then the delivery of the test to an examinee is initiated.

U.S. Pat. No. 5,915,973 (Hoehn-Saric et al.) describes a system for controlling administration of remotely proctored, secure examinations at a remote test station, and a method for administering examinations. The system includes a central station, a registration station and a remote testing station. The central station includes (a) storage device for storing data, including test question data and verified biometric data, and (b) a data processor, operably connected to the storage device, for comparing test-taker biometric data with stored, verified biometric data. The remote test station includes (a) a data processor, (b) a data storage device, operably connected to the data processor, for storing input data, (c) a biometric measurement device for inputting test-taker biometric data to the processor, (d) a display for displaying test question data, (e) an input for inputting test response data to the processor, (f) a recorder for recording proctoring data of a testing event, and (g) a communication link for communicating with the central station, for receiving test question data from the central station, and for communicating test-taker biometric data, test response data, and proctoring data to the central station. Verification of the test-taker and validation of the results can be performed either before or after the testing event.

U.S. Pat. No. 5,947,747 (Walker et al.) describes methods and apparatus for computer-based evaluation of a test-taker's performance with respect to selected comparative norms. The system includes a home testing computer for transmitting the test-taker's test results to a central computer which derives a performance assessment of the test-taker. The performance assessment can be standardized or customized, as well as relative or absolute. Further, the transmitted test results are configured to reliably associate the student with his test results, using encoding, user identification, or corroborative techniques to deter fraud. Thus, for example, the system allows a parentally-controlled reward system such that children who reach specified objectives can claim an award that parents are confident was fairly and honestly earned without the parent being required to proctor the testing. Fraud, and the need for proctoring, is also deterred during multiple students testing via an option for simultaneous testing of geographically dispersed test-takers.

U.S. Pat. No. 7,069,586 (Winneg et al.) describes a method of and system for securely executing an application on a computer system such that a user of the computer system cannot access or view unauthorized content available on the computer system or accessible using the computer system. To securely execute the application, such method and system may terminate any unauthorized processes executing (i.e., running) on the computer system application prior to execution of the application, and may configure the application such that unauthorized content cannot be accessed, including configuring the application such that unauthorized processes cannot be initiated (i.e., launched) by the application. Further, such system and method may terminate any unauthorized processes detected during execution of the application and may disable any functions of the computer system that can access unauthorized content, including disabling any functions capable of initiating processes on the computer system. The application being securely executed may be any of a variety of types of applications, for example, an application for receiving answers to questions of an examination (i.e., an exam-taking application). Securely executing an application may be used for any of a variety of purposes, including, among other purposes, to assist preventing students from cheating on exams, to assist preventing students from not paying attention in class, to assist preventing employees from wasting time at work, and to assist preventing children from viewing content that their parents deem inappropriate.

U.S. Pat. No. 7,257,557 (Hulick) describes a method, program and system for administering tests in a distributed data processing network in which predetermined test content and multimedia support material are combined into a single encrypted test file. The multimedia support may include visual and audio files for presenting test questions. The encrypted test file is exported to at least one remote test location. The test locations import and decrypt the encrypted test file and load the test content and multimedia support material into a local database. The test is administered on a plurality of client workstations at the testing location, wherein the test may include audio questions and verbal responses by participants. During testing, biometric data about test participants is recorded and associated with the test files and participant identification. After the test is completed, the completed test results, including verbal responses and biometric data, are combined into a single encrypted results file that is exported to a remote evaluation location. The evaluation location imports and decrypts the encrypted results file and loads the test results into a local database for grading.

U.S. Pat. Appln. Publ. No. 2007/0117083 (Winneg et al.) describes systems, methods and apparatuses for remotely monitoring examinations. Examinations are authored and rules are attributed to the exams that determine how the exams are to be administered. Exam proctors monitor exam takers from remote locations by receiving data indicative of the environment in which the exam takers are completing the exams. A remote exam monitoring device captures video, audio and/or authentication data and transmits the data to a remote proctor and data analysis system.

In spite of these and other patents and applications that describe methods of preventing cheating on examinations, a brief Google search reveals that cheating on examinations is prevalent worldwide. Thus, these inventions have not been successful in eliminating cheating on examinations. For example, recently students taking examinations for credit in connection with MOOCs have found that they can register many times for a course, and collect and combine the results of multiple simultaneous examinations to compose a single correctly answered test for submission for credit. This is known as Cameo cheating.

The following companies provide proctor services during exam/tests:

ProctorU
https://www.proctoru.com/
Kryterion—acquired by Pearson in 2015
https://www.onlineproctoring.com/
Examity
http://examity.com/
Pearson Vue—both online proctored test and a network of physical test centers
https://home.pearsonvue.com/
Proctorio
https://proctorio.com
B Virtual Inc.
https://bvirtualinc.com/
Question Mark Online Proctoring
https://www.questionmark.com/content/online-proctoring-service These companies have a similar sequence of the services provided: proctor identifies test-taker person (using test-taker's passport or any other documents); proctor continues to observe the testing session (all sessions are video recorded, desktop of the test-taker computer will be also recorded), and proctor checks the test-taker during the test (it can be made in a way of questioning the test-taker or audio signals that ring at certain times).

According to the presentation of Kryterion company: " . . . After the proctor verifies that your ID matches your image appearing on their web camera, they will ask you to answer a few security questions. These will further ensure that the correct person is taking the exam."

So, basically, 'cheating' means receiving test answers while proctor observes test-taker sitting in front of the computer.

Cheating consists of two stages: interception of unique test questions and receiving answers to test questions. Receiving answers can be much easier for a cheating test-taker than intercepting information from a company that sent special tests to the examinee.

Online proctored testing (almost all of the above-mentioned companies) allow test-takers to take and pass exams from their homes. This fact increases the possibility of cheating.

Receiving answers which won't be noticed by proctors can be made by following ways: answers are depicted at tablet or smartphone located behind (or near) the monitor; projection of the answers to any surface (wall, screen, etc.) behind the monitor are also used (FIG. 1); using a compact Morse code transmitter by touching the skin of the test-taker; micro-earpiece located in the ear, vibrations in the seat, etc.

Question interception can be effected by hidden micro-cameras (located in the wall or at the test-taker's clothes) which capture the monitor screen with answers on it and send it to test-taker's consultant. Alternatively, it can be effected by a transmitter which captures video signals from the system unit to the monitor, and be located in conjunction with monitor wires, and then sent it to the consultant.

As generally used herein, a "test" is any type of question-based application that requires analysis by a person taking the test and a response from this person. A test may therefore be considered an examination, a quiz, an assessment, an evaluation, a trial and/or an analysis.

SUMMARY OF THE INVENTION

The present invention is directed at addressing and ideally solving the problem of guaranteeing with high certainty that a student taking a test is acting alone without the aid of a consultant or other helper or otherwise cheating.

An arrangement for test-taking includes a head wearable device which includes at least one sound or vibration sensor for detecting sound or vibration, at least one optical imaging device that obtains images of an area viewed by the student, and a display which is only viewable by the test-taker. The display can be a light emitting display such as an LED or OLED, a light reflective display or a retinal projector display. A processing unit is coupled to the sensor(s) and imaging device(s), and receives and analyzes data therefrom to determine whether the test-taker is interacting with another person and/or whether the test-taker is communicating with another person. The processing unit also decrypts tests questions sent to it for display on the display.

A headpiece in accordance with the invention includes a frame having a support portion adapted to be supported on a person's head and a viewable portion adapted to present visual data to the person when the support portion is supported on the person's head. This headpiece may be of the type like, for example, Google Glass™. A self-contained electronics assembly includes at least one imaging device and a display and is arranged on a frame similar to a glasses frame and obtains images of the environment in front of the person when worn on the person's head. A processor is arranged within the self-contained electronics assembly mounted on the frame and can be coupled to a remote server and/or a computing device such as a smartphone, personal computer, laptop or tablet. The processor is configured to control content of the viewable portion based on input received from the remote server or connected computing device. At least one audio or contact microphone is integral with the electronics assembly which detects audio or vibrational communications. The processor monitors detection of communications detected by the at least one microphone and images obtained by the at least one imaging device when the viewable portion is displaying a test to determine whether a person other than the person on which the frame is supported is present or providing information to the test-taker or that the test-taking person is talking. The contact microphone may be used as a user interface in which case the processor monitors detection of sound or vibration by the contact microphone when the viewable portion is displaying a test.

A method for detecting an attempt to physically gain access to or alter the electronics assembly in accordance with the invention is a type of chassis intrusion detector. In the method, the device is enclosed by a film onto which is deposited a labyrinth of conductive wires comprising a continuous circuit. The resistance, capacitance and/or inductance of the circuit is monitored for a break in the circuit which would correlate with any attempt to breach the electronics and sensor assembly.

The security assembly can include a processor, a power source for providing power to the processor and a volatile RAM assembly containing private executable code or information such as a required security code, or private key, or other private information or code for use of the device for test-taking purposes. The security assembly is configured such that any attempt to disassemble the security assembly will break one or more wires connecting the power source to the RAM or cause a change in capacitance, resistance or inductance relative to a threshold which will cause the private information to be erased from the RAM assembly. The security assembly is coupled to the electronics assembly which, with the security assembly, resides within the space enclosed by the film with the wire labyrinth. An aperture is provided in the envelope defined by the wire labyrinth in which the electronics assembly is placed, the aperture permitting a wire to connect the electronics assembly to the external server or computing device. The wire labyrinth is sufficiently transparent as to permit the camera(s) to obtain images there through and permit viewing of the display by the test-taker.

An intrusion-protected electronic device in accordance with the invention includes an envelope defined by a wire labyrinth, that encloses the electronics assembly including the security assembly coupled to the film and that periodically measures the capacitance, resistance and/or inductance of the wire labyrinth. The security assembly is configured to monitor the measured capacitance, resistance and/or inductance to determine changes in one of these properties, changes in any of these properties being correlated to an attempt to breach or alter the device.

Additional devices which can be part of the electronics assembly and which are designed to operate through the security film include:

1. A camera for obtaining iris, retinal or partial facial scans.
2. A microphone for monitoring sound in the vicinity of the test-taker or emitted by the test-taker.
3. A sound maker used for testing the microphone sensitivity.
4. A camera for monitoring the area between the display and the test-taker's eye.
5. A bone microphone for detecting sound emanating from the mouth of the test-taker.
6. A device mounted in connection with the bone microphone for detecting the presence of the test-taker's skin.

BRIEF DESCRIPTION OF THE DRAWINGS

The following drawings are illustrative of embodiments of the system developed or adapted using the teachings of at least one of the embodiments disclosed herein and are not meant to limit the scope of the disclosure as encompassed by the claims.

FIGS. 2 and 3 show forward and back views of the monitor device of the invention.

FIGS. 4 and 5 illustrate cutaway views of the monitor of the invention.

FIG. 24 shows an alternative type of monitor frame.

FIGS. 25 and 26 show devices based on standard glasses with one lens remaining.

DETAILED DESCRIPTION OF THE INVENTION

Figure 1:
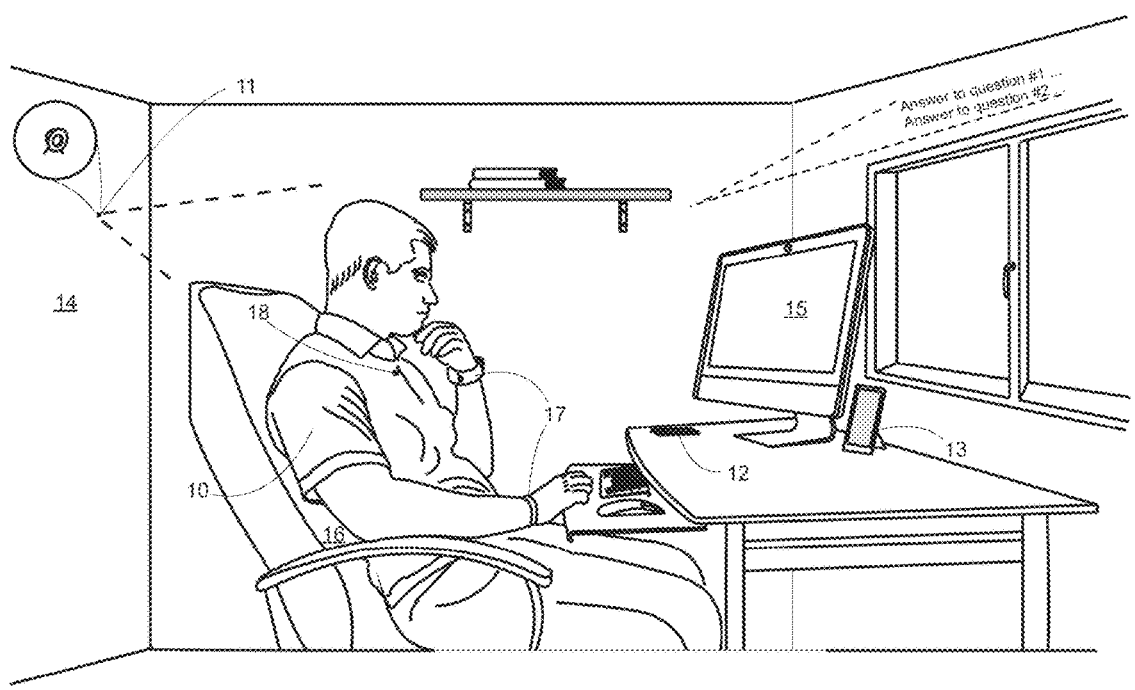
FIG. 1 illustrates possible cheating methods used by test-taker.

A primary concept of the present invention is that a student located anywhere in the world ought to be able to obtain the equivalent of a degree from any college or university, providing that the student can prove that he or she has mastered the coursework. This proof often comes from the student passing a series of examinations. Since the student can be located anywhere in the world, it can be impractical for that student to travel to a particular place in order to take an examination.

Hiring organizations do not always care where the person has acquired the expertise if they can be confident that the student has done so. As an employer, for example, a manager does not care as much whether a person graduated from Harvard or MIT as he/she does whether the prospective employee has mastered the coursework. On the other hand, having a degree listed on a person's resume can greatly affect the person's opportunities for employment throughout his or her lifetime. In the United States, however, colleges and universities have become unreasonably expensive, especially when consideration is given to the fact that for the most prestigious schools, the student usually is required to reside on or near the campus. This residency requirement has little to do with his or her mastery of physics, engineering or other scientific or non-scientific subjects, but handicaps an otherwise qualified student from job opportunities and lifetime earnings.

A student can typically learn the coursework on his or her own and in fact, studies have shown that for many students attending class is largely a waste of time. Over the Internet, a student can be exposed to the very best teachers providing well constituted lectures, textbooks and other coursework. If this is done with many students, the cost per student is minimal What is needed, however, is a method of verifying that a student has mastered the subject matter through taking and passing examinations over the Internet or in a classroom and without cheating and at minimal cost to the institution.

An objective of the present invention is therefore to provide a system that can ascertain the identity of a test-taker with certainty and that cheating has not occurred during test-taking. Prior to discussing how these goals are achieved, an understanding of the cheating prevention process needs to begin with an analysis of the flow of information from the test-providing institution to the student's eyes.

For now, assume that the test is a multiple-choice test or one where the answer is in the form of a number. The institution can randomize the questions on a test so that no student will take the same test with the same order of the questions. Therefore, knowing the answers provided by one student cannot help another student. As a result, the answers which are sent back to the test-provider do not need to be encrypted.

The questions making up the test however do need to be encrypted and careful attention needs to be paid to where the decryption process occurs and to the protection of the private key which performs the decryption and the process by which it is generated. For example, if the decryption occurs in an unprotected computer, then two problems arise. First, the decrypted test can be captured, and a copy sent to a computer in another room, for example, or the private key can be copied, and a second computer can simultaneously decrypt the test. Once the test can be viewed by a consultant who is not seen by a proctoring system, the consultant can transmit the answers to the test-taker by a countless number of methods facilitating cheating.

Consider how the consultant might conduct this transmission to the test-taker. Perhaps, the consultant is in an adjoining room and transmits answers using RF communication to a device hidden on the body of the test-taker which retransmits to a receiver pressed against a bone in the test-taker's head, hidden by his or her hair, or mounted on his or her teeth. Both such devices are readily available. The RF frequencies used can be chosen to be undetectable by any device designed to detect such transmissions since the range of frequencies available span more than 6 orders of magnitude and, in addition, frequency hopping techniques can be used. An RF sensor mounted anywhere cannot pickup such transmissions without knowing the transmitted frequency and coding scheme.

Even if the consultant is in another country, if he or she can see the test, there is no way to prevent transmission of answers to the test-taker. Other methods include vibrators in the seat, wires attached to bone-mounted speakers, etc. The consultant can even project the answers onto a portion of the room ceiling, walls or floor which is not covered by room monitoring cameras but observable by the test-taker and can even alternate such locations to fool systems that monitor the test-taker's behavior. Basically, there is no method of preventing the consultant from communicating answers to the test-taker and therefore, it is necessary to prevent the consultant from obtaining a copy of the test questions.

If the questions are decrypted on an ordinary computer, then many potential information leakage problems exist. Regardless of the operating system, if the consultant can obtain access to the processor board of the computer, then the connector that connects to the display can be removed and reconnected to a splitter inserted in such a manner that the display operation is unaffected but a second set of wires are now available which contain the display information. These wires can be connected to a small processor which connects them to a transmitter to send the display information to another room by undetectable RF. Alternately, a simple wire can be used, hidden from view of whatever monitoring cameras are present.

Another approach is to steal the private key which cannot be protected in an arbitrary computer. Once the consultant has the key, then he or she can intercept the transmissions to the computer and decode the test in a second computer. The conclusion is that the private key, and/or the code used to generate the key, must be stored and the decryption process must be undertaken in a special protected device which will be discussed below.

Consider now the display. If there is a display where the questions can be seen from anywhere other than the eyes of the test-taker, then there is another path for leakage of the test questions. If decryption occurs right at the display and the display is protected from tampering, the display itself can facilitate transmission of the test questions. A camera looking through an undetectable port in a wall, see FIG. 1, or undetectably worn by the test-taker, can capture the image of the test questions and transmit this to a consultant by any number of methods. Thus, either the display must be scrambled, so that only the test-taker wearing special glasses can see the questions, or the display must be so close to the test-taker's eyes that no one else can get close enough to see it. The second of these approaches will be discussed below. The conclusion is that no ordinary display or ordinary computer is usable without incurring a risk of cheating.

Some methods for accomplishing the objective of cheating prevention which have been considered include using one or more cameras which can image a substantial portion of the space around the test-taker so that a consultant (or other person aiding the test-taker) cannot be located in a position where he or she can influence the test-taker without being seen by one or more cameras. A structure has been proposed such that the computer on which the test is being taken will not be accessible by another computer in another room, for example, where a consultant can simultaneously view the exam and communicate the answers to the test-taker. If this structure is separated from the display and if the display is not scrambled or very close to the test-taker's eyes, as described above, this approach can be easily defeated. Also, it is not required that the consultant be where he or she can be observed by any cameras.

Similarly, it has been proposed that a microphone is preferably available to monitor the audio environment where test-taking is occurring to prevent audio communication with the test-taker by a consultant. A microphone will not pick up communications from the consultant in the form of RF communications translated into sound at a head bone, for example. The microphone will pick up any oral communications from the test-taker and thus it can be a necessary part of the system to detect if the test-taker is orally reading the questions to a consultant. To make sure that the microphone has been activated, a speaker or other sound source may be necessary to periodically create a sound which can be sensed by the microphone. Otherwise, the test-taker can cover the microphone or otherwise render it useless. An alternative or complementary approach, as described below, can make use of a contact microphone pressed against the cheek bone of the test-taker which will pick up sound emanating from the mouth of the test-taker but not be heard by the audio microphone. An audio microphone picks up sound from the environment in addition to that from the test-taker. These sounds can drown out or otherwise prevent the microphone from picking up the test-taker from softly speaking into a hidden microphone that communicates with a remote consultant. These and other methods and apparatus are discussed below but already it has become evident to the inventor that the apparatus that is used to take the test must be especially designed to solve the issues mentioned above.

The identity of the test-taker must be known and can be ascertained using one or more of a variety of biometric sensors and systems such as a palm, fingerprint, heartbeat shape, iris, retinal or other scan, a voiceprint, or a good image of the test-taker coupled with facial recognition as further discussed below. For the purposes of the present invention, the primary biometric identification system will rely on the use of a small camera which has been designed to periodically image the test-taker's iris, retina or portion of the test-taker's face as discussed below.

When taking a test, the student can go through a process which sets up the apparatus and validates its operation. The student can then confirm his identity which will have been previously established and stored locally or remotely for comparison. The process of ascertaining the identity can be recorded for later validation. Output from the various monitoring systems can be fed to one or more pattern recognition systems such as trained neural networks which have demonstrated a high accuracy.

Each time the student takes one or more tests and thus demonstrates his or her mastery of the coursework (by passing), he or she can be awarded credits and after sufficient credits have been obtained, he or she can be awarded a degree. After the degree award, the student would then presumably begin working for a company, government agency, or other organization and the system should periodically be verified through consultations or surveys with the management of the organization to ascertain that the hiring organization is satisfied with the proficiency of the student derived from the online courses. This feedback allows for continuous improvement of the overall educational and testing process and system.

Naturally, the degree-granting institution will incur some costs during this process and thus, some payment from the student to the institution may be considered. Depending on the circumstances, this payment can be a charge per course, per test or per degree. Since the earning power of the student can be significantly increased, and the out-of-pocket cost to the institution is small, these payments can be postponed until the student is being paid by a hiring organization and, in fact, such an organization may be willing to cover these payments. In any event, the payment should be relatively small when compared to the typical cost of a traditional college education. However, the degree-granting institution by this method, can greatly expand the number of degrees granted and thus, although the payment per student will be small, the total sum earned by the institution can be substantial.

A good review of the state of higher education in the United States and of the rise of MOOCs can be found in the Nicholas Carr's article on the subject as published in the MIT technology review. The article can be found on the following Internet website. http://www.technologyreview-.com/featuredstory/429376/the-crisis-in-higher-education/. Quoting from this article "Machine learning may, for instance, pave the way for an automated system to detect cheating in online classes, a challenge that is becoming more pressing as universities consider granting certificates or even credits to students who complete MOOCs." It is an objective of this invention to respond to the mentioned challenge.

As discussed in numerous places in the literature, there is a significant difference in the complexity of evaluating a student's proficiency through tests which can be machine graded depending on the course subject matter. For those math and science courses where a numerical answer is to be derived, machine evaluation of the test is relatively simple. However, for those disciplines where a reasoning or writing skill or an artistic skill is evaluated, there is great controversy as to whether this can be done by machine testing. This issue will not be addressed further here other than to note that more research in this area is necessary.

It is not an objective of this invention to determine how a test should measure a student's proficiency nor how it should be graded. The primary objective here is to provide confidence to the degree-granting institution that the student who is taking a test is in fact the student who has registered for the course and that the student is acting alone without the aid of a consultant who may be remote or nearby. This assurance should be provided with a probability of cheating reduced to on the order of one in 100,000 and, similarly, the false accusation that cheating is taking place reduced to a similar probability.

When a student decides to enroll in a degree program, for example, or even to enroll in a course for which he or she desires credit, the first step will generally be to register with the organization, typically a college or university, and to establish the beginning of the student's record. During this registration process, for the case where the student intends to get credit for one or more courses taken online, the student will be required to submit various types of information which will permit the student to be identified positively over the Internet. Although generally there may be no charge for taking the course, there will generally be some charges related to the test-taking and administration of the student's program. In a preferred embodiment of this invention, a specially configured device will be loaned or sold to the student to be used primarily for test-taking.

Wearable glasses which meet the objects of this invention are described below and are configured so that all the functions necessary to identify the student and significantly reduce the opportunity for cheating are incorporated within the glasses design, hereinafter called the "Monitor". At the end of the course, or when the student completes his relationship with the institution, he or she may be required to return the Monitor; however since the Monitor may be linked to the student's biometric-based identification, the biometrics stored on the device, if any, would need to be erased or overwritten by those of another student (described below). In one method, the cryptographic key set used for decrypting a test is created based on one or more biometric measurements each time the student puts on the Monitor. In this case, one Monitor can be used for any number of students and a student can use any Monitor. In this case, the student's biometrics can only be stored on the Monitor while it is in use by the student and erased when the student removes the Monitor. This also removes biometric privacy concerns.

Since the value of a degree from a prestigious institution can be immense, the motivation to cheat when taking a test can be enormous. One can foresee, for example, an industry of consultants developing solely for aiding students in taking tests and thus obtaining a degree. The system of this invention is therefore configured to minimize the possibility of success of such consultants.

If a student, when taking a test, is inclined to cheat, this inclination can be facilitated if a helper or consultant has access to the display which shows the test while it is being taken. If the consultant has such access, then he or she will use a communication method by which he or she can transfer information to the test-taking student in a manner that cannot be detected. This invention is intended to eliminate the opportunity of the consultant from observing the display or otherwise learning the content of the test questions and therefore of being able to derive and communicate answers to the test-taker.

If the student were to use his or her private computer for displaying a test, it would be generally relatively easy for a consultant to attach a second remote monitor which would display the same information as the primary monitor. There exists software, for example, which permits someone who is even located remotely from a particular computer to observe the display of that computer. Alternatively, if the student or his consultant has access to the ports and operating system of the computer upon which the student takes tests, access to the information on the display is relatively simple to achieve. The only method of preventing this is to design a device which prevents other computers from connecting with the device in such a manner that the display can be copied. Thus, in a preferred implementation of the invention, it will be assumed that a special device, and in particular a wearable glasses type device, herein called the Monitor, has been configured and provided to the student for those cases where the student desires credit for the course he or she is taking.

FIG. 1 illustrates a student 10 taking an examination using any one of various proctoring systems such as Examine or Proctor U. The student 10 can get help when answering the questions of the examination if the consultant has access to these questions. This can be accomplished in many ways such as through a hidden camera 11 which can be embedded in a wall 14 facing a computer screen 15 used for administering the test, hidden on the student 10 and looking through a hole in the student's shirt 18 or embedded in a piece of jewelry 17, or, most easily, a transmitter can be built into the computer which transmits the contents of the display to the consultant in another room.

Since the consultant can see the questions, there are countless ways that answers can be communicated to the student such as by projecting them on the floor, a wall or ceiling, placing a bone speaker in the student's seat 16 where it will contact the student's spine, for example, or even tying a string around the toe of the student and pulling three times for answer c. Broadcasting answers can be provided by smartphone 12 or tablet 13 behind the computer monitor 15. None of these methods, and countless others, can be detected by an online proctor. It is thus not possible to prevent a consultant from communicating with the test-taker, leaving the only remedy left of preventing the consultant from knowing the test questions.

Of course, other methods are available such as bribing the proctor or someone that can provide a copy in advance of the test questions and answers. Prevention of these methods will be discussed below. Since cheating is easily accomplished using all known proctoring or other anti-cheating methods, there is an urgent need for a system that cannot be defeated. Until that is available, granting of credit for online education is not possible.

A device constructed in accordance with the teachings of this invention is illustrated in FIG. 2 which is a perspective view of a head-worn glasses type device, generally referred to as a monitor 20, containing an electronics assembly (PCB) 22a with several sensors, cameras and a display all protected with a chassis intrusion detector 22 (CID) prepared using teachings herein.

FIG. 2 is a view from the front showing the device or monitor 20 which comprises three main parts: plastic housing parts 21a and 21b (collectively referred to as a housing 21) and internal PCB parts covered by chassis intrusion detector 22 (CID). Housing part 21a serves as a cover.

Housing part 21b extends from an eyeglass frame 21c. Housing part 21b can be substantially L-shaped with a first portion extending straight outward from an edge of the frame 21c and second portion substantially perpendicular to the first portion and positioned in front of the frame 21c. The frame 21c has a lens portion including an aperture for receiving an optional see-through lens (prescription or plain glass) and a support portion extending rearward from the lens portion. The support portion may be two temples as shown, or an elastic headband as described below.

FIG. 3 is a perspective view of the apparatus of FIG. 2 looking from the rear. The rear view shows a cross-view camera 23, a display 27, a contact (bone) microphone 38, and a microphone 24. A wire from the PCB 22a comprises, e.g., four flat conductors and passes though the CID 22. A USB plug 25 is built in a way that it snaps into the housing 21. Plug 25 is located outside of the CID 22.

A head-worn display and electronics device constructed in accordance with the invention is shown generally in FIGS. 2, 3, 4, 5, 7, 8, 16, 17, 18, 25 and 26.

FIGS. 4 and 5 illustrate monitor cutaway drawings showing the internal design of the device. FIG. 5 shows the contact microphone 38 with embedded contact sensor, which can be a skin temperature sensor (thermocouple), pulse from blood flow sensor (as in a pulse oximeter), or part of an EKG sensor. An EKG sensor requires two sensors displaced from each other in order to get a measurement of the heart pulse shape. Only one is shown in FIG. 5.

FIG. 4 shows positions of the cross-view camera 23, buzzer 28, iris camera 26, 29, forward-looking camera 30, where monitor plastic housing part 21*a* and CID 22 (from FIG. 2) have been removed.

Display 27 is arranged in the housing part 21*b* and pointed toward the right eye of test-taker, and displays the test questions (although alternatively, a display can be pointed toward the left eye of the test-taker). Forward viewing camera 30, representative of an imaging device, is also arranged in the housing part 21*b* and monitors the field of view of the test-taker outward from the monitor 20. Camera 30 can have a field of view of approximately 120°. Buzzer or sound maker 28 is arranged in the housing part 21*b* and periodically provides a sound detectable by the microphone 24 so as to verify that the microphone 24 has not somehow been rendered inoperable. Microphone 24 and buzzer 28, or alternately a speaker, are on the PCB 22*a* and thus holes are located on the side of the housing 21.

Display 27 is arranged at a terminal end of the second housing part 21*b*. The forward viewing camera 30, or other imaging device, the microphone 24 and the buzzer 28 are also arranged on the side of the second housing part 21*b* (see FIG. 4). Each of these components is connected to a processor-containing electronics package in housing 21 which is mounted to the frame 21*c* in a manner known to those skilled in the art to which this invention pertains. A cable emanates from the electronics package in housing 21 and can contain the USB connector 25 for connecting onto an external device such as a power and communications module, smartphone or computer.

The iris, or retinal scan, camera 26, 29 is arranged in housing 21, pointing inward toward the wearer, and measures biometrics of the test-taker (see FIGS. 3 and 5). Such biometrics can include an iris or retinal image, image of the blood vessels in the white portion of the eye or an image of the portion of the face surrounding the eye. Illumination of the eye can be provided by LEDs arranged in the housing 21 which can be in the IR or visible portions of the electromagnetic spectrum. Iris camera 26, 29 is therefore more generally considered biometric scan cameras.

Software and a processor which controls administration of tests can be resident on an external server of the test-provider and operates in conjunction with the electronics package in housing 21.

Camera 23 can also be provided in housing 21 to check for any anomalous activity which might take place near the glasses (see FIG. 3). Such a camera 23 can enable detection of whether an image capture device has been either temporarily or permanently affixed to the device 20 or to the face of the test-taker which can capture the image on the display 27. Similarly, camera 23 can monitor the space surrounding the left eye of the test-taker to assure that such an image capturing device and or another display for providing aid to the test-taker is not being employed by the test-taker in conjunction with his left eye. The camera 23, or more generally an imaging device, is arranged on the first housing part 21*a* and oriented to image most of the frame 21*c* (see FIG. 3).

To further discourage cheating, if the test-providing institution is providing tests to 1000 test-takers either simultaneously or at different times, and if the test is of a multiple-choice type and contains fifty questions, the order of the questions can be scrambled and thus different for each test provided. Since this provides a very large number of different tests each containing the same questions, there is little risk that answers from one set of questions can be of any value to a test-taker taking a different ordered set of the same questions.

The entire electronics package of the device 20 (FIGS. 2-5) is encapsulated in a thin film 31 (FIG. 6) called a chassis intrusion detector (CID). As described below, an array of wires can be printed onto a plastic film encapsulating the electronics package, including the display and cameras, in housing 21 such that any attempt to break into the housing 21 will sever one or more of the wires.

A private key for decoding the test questions and any other commands sent by the test-providing institution can be held in volatile RAM memory in, for example, housing 21 which is kept alive through an extended life (10 years) battery which also can be recharged when the device 20 is connected to power through connector 25. If the chassis intrusion detector system detects an attempt to break into the housing 21, then power to the RAM memory can be shut off and the private key and any other private information will be erased.

When the test-taker is preparing to take a test, he or she will place the device 20 onto his or her head. An image will be acquired of the iris, retina, or other biometrics by the camera 26, 29 and sent to a server. At the completion of this process, test questions will be transmitted to the device 20, decrypted and displayed on the display 27, for example, one at a time.

Camera 26, 29 is controlled to periodically check to ascertain that the test-taker's iris is present and that it has not changed. This is controlled by processor in the device 20. If anything anomalous occurs, such as the absence of an iris or the change of position of the iris, then the display 27 will be deactivated by the processor. Thus, when the test-taker removes the device 20, the display 27 will automatically stop displaying test questions. Similarly, if the test-taker transfers the device 20 to another person whose iris does not match that of the test-taker, then the display 27 will not show test questions. Above and in what follows, the iris will be used to represent any of the aforementioned biometric scans observable by each camera 26, 29.

When the test-taker has completed the test questions, then he or she will indicate such through the mouse or keyboard and the display 27 will no longer display test questions. The remainder of the interaction with the test-providing facility can then occur as described below.

Forward-looking camera 30 can have a field of view (FOV) of about 120°. This FOV will cover the hands of the test-taker to check for the case where the test-taker is typing in the questions on a keyboard where they are transmitted to a consultant. If the hands of the test-taker cannot be seen by camera 30, the display 27 will be turned off until the hands can be seen. If this happens frequently, the test can be terminated. Camera 30 can also be used to check for the existence of other devices near the test-taker. These devices may include a tablet or other computer, a smart phone, books or papers, displays, or any other information source which is not permitted to be used for the particular test. If the test is an open book test, then use of the above-listed objects can be permitted. Software which accomplishes these pattern recognition tasks can utilize one or more trained neural networks.

The test-taker may have enabled a hidden switch which disconnects the keyboard from the device 20 and connects it to a consultant thereby enabling the test-taker to send test information to the consultant. Camera 30 can determine that the test-taker is typing and the processor can ascertain that the device 20 is not receiving the typed information and indicate a fault. For most tests, a keyboard will not be necessary and thus it can be eliminated from the setup to minimize its use for consultant communication.

A limited number of encrypted commands which relate to the test being administered can be transmitted with the encrypted test from the test-providing institution. These commands control some aspects of the test-taking process such as whether it is an open book or closed book examination, whether it is a timed test and if so how much time is allowed, how many restarts are permitted, how many pauses are permitted etc. Since the test process is controlled by the device 20, these commands will be decrypted and used to guide the test-taking process by the device 20.

Camera 30 similarly can be used to check for anomalies near device 20. Again, the pattern recognition software used with camera 30 can utilize one or more trained neural networks. Camera 30 can check for small cameras which may have been glued to the face of the test-taker which are not observable by the camera 26, 29 but nevertheless can capture a view of the image displayed on display 27. This of course is less of a problem if a direct retinal projector display is utilized. Also, the FOV of the display 27 in limited so that only the area near the eye of the test-taker can see the display 27. Thus, to see and capture the display 27, a camera will need to be near the path from the display 27 to the eye. Furthermore, the design of the device 20 is such as to minimize the available structure which would permit the installation of a hidden camera.

Camera 30 also can be used to monitor for anomalous devices which can be seen by the test-taker's left eye which could be a source of information to the test-taker. To further guard against such anomalous events, a second camera, not shown, may be placed on frame 21c but at another location that provides a better view of the space surrounding the test-taker's left eye.

Bone microphone 38 snaps into the housing and located in the side of the housing 21 so that it is in direct contact with that portion of the housing 21 which will be pushed against the cheek bone of the wearer. Bone microphone 38 must contact the wearer's face through the housing 21 at the cheek bone or other bone. The function of the bone microphone 38 is to detect any vibrations such as are caused by talking or even whispering by the test-taker.

Housing 21 can also have two holes, one for a small LED 38a and the other for a small photocell 38b (see FIG. 5). Each hole can be about 2 mm in diameter. They will be placed in the center of the bone microphone 38 and holes can be drilled through the microphone 38 for the wires from the photocell and LED to travel to the PCB 22a. An alternative is to replace the LED 38a and photocell 38b with a thermocouple which measures the skin temperature of the test-taker. In either case, the purpose is to ascertain that the bone microphone 38 is pressed against the cheek bone when the device 20 is worn by the test-taker so that it will sense any sounds coming from the mouth of the test-taker.

Generally, there should be no talking while test-taking is in progress. Microphone 24 is used to detect audio sounds and spoken words. If such words are detected particularly emanating from the test-taker, then the test can be paused or terminated depending on the test-providing institution's requirements.

To prevent the microphone 24 from being covered with sound absorbing material, speaker, buzzer or other sound creator 28 is provided to periodically create a sound which is then detected by the microphone 24 and the quality of the detected signal can be ascertained. If the microphone 24 cannot clearly hear the sound produced by the sound maker 28, then the test can be terminated until the issue is resolved. Sound maker 28 may be placed at an alternate location on the housing 21 or frame 21c to minimize direct sonic conduction through the structure.

Figure 6:
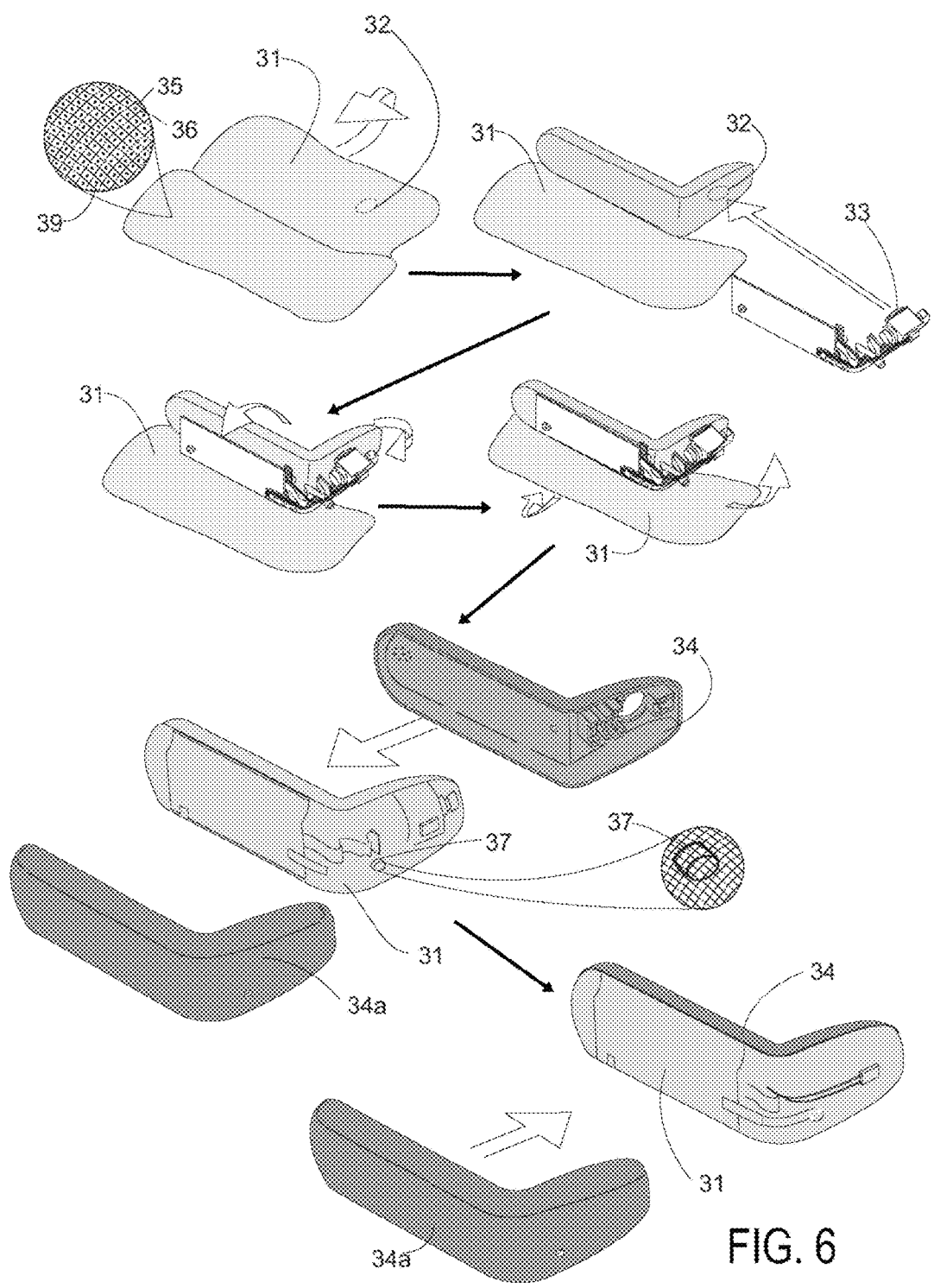
FIG. 6 is a chassis intrusion detector design and its assembly sequence.

A schematic of the operation of the chassis intrusion detector 22 is provided in FIG. 6. Since the chassis intrusion detector 22 is designed to encompass the entire electronics and sensors assembly, it must be relatively thin so as not to interfere with the microphone 24 and speaker and be transparent such as to not interfere with the display or cameras.

The CID 22 is a thin film which wraps around the PCB 22a and other parts. It can be made from a single sheet folded over and then glued together. It must conform closely to the camera and display lenses so as not to distort the image. A wire to the USB connector 25 will be very thin where it goes through the CID 22. Connector 25 can snap into a holder built into the housing 21.

A preferred construction, as illustrated in FIG. 6, is to provide a single film layer comprising a labyrinth of wires 35, 36 which are very narrow and closely spaced such that any attempt to penetrate the film will cause one or more of these wires to be cut. The base film can be made from polyimide onto which is printed the electric wires. The final assembly is covered with a thin coating to insulate the wires 35, 36. A microprocessor monitors the total resistance, inductance or mutual inductance of a circuit including the wires 35, 36 and erases the private information if there is a significant change in these measurements. Since any attempt to break into the electronic and sensor assembly will necessarily sever one of these wires 35, 36, this design provides an easily detectable method of determining an attempt to intrude into the system electronics and sensor assembly.

CID 22 has following properties:

1. The wires 35, 36 go along both sides (FIG. 6). They can be run one way on one side and cross at right angles on the other side.

2. The wires 35, 36 on one side will be connected to those on the other by plated through holes so that there is one continuous circuit.

3. On the underside near the mating socket in the PCB 22a, the wires 35, 36 will get wider (~200 microns) so that a 2-pin connector can be attached.

4. The CID 33 has very small holes 39 (~50-100 microns diameter) located in the centers between the wires 35, 36 to allow it to breathe to prevent the buildup of heat from the electronics.

Assembly procedure may comprise the following steps (FIG. 6):

Step 1: prepare to wrap film 31 constituting the CID 22 around PCB 22a.

Step 2: wrap CID 22 over the PCB 22a. Critical part here is the attachment of the CID 22 to a display lens 33. Circle 32 is a marked location on the CID 22 opposite the position of display lens 33. Circle 32 will be glued to the display lens 33.

Steps 3, 4: after gluing the PCB assembly, plug the CID 22 into the PCB 22a and wrap the rest of CID 22. Now, the PCB 22a is fully covered by the film 31 to form the CID 22.

Step 5: insert PCB 22 in housing 34; forward looking camera 37 and cross view camera are covered by the film 31 of the CID 22.

Step 6: Snap housing part 34a (like housing part 21a) into the housing 34 (like housing part 21b).

Figure 7:
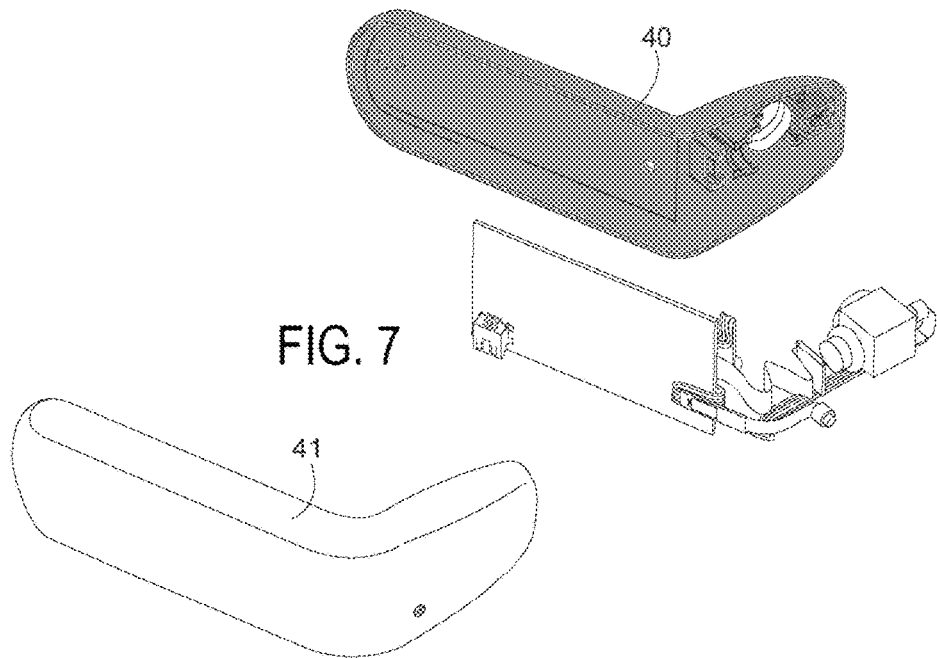
FIG. 7 shows the unassembled monitor housing.

FIG. 7 shows the unassembled device housing: rear housing part 40 and front housing part 41 (like housing parts 21b, 21a, respectively).

Figure 8:
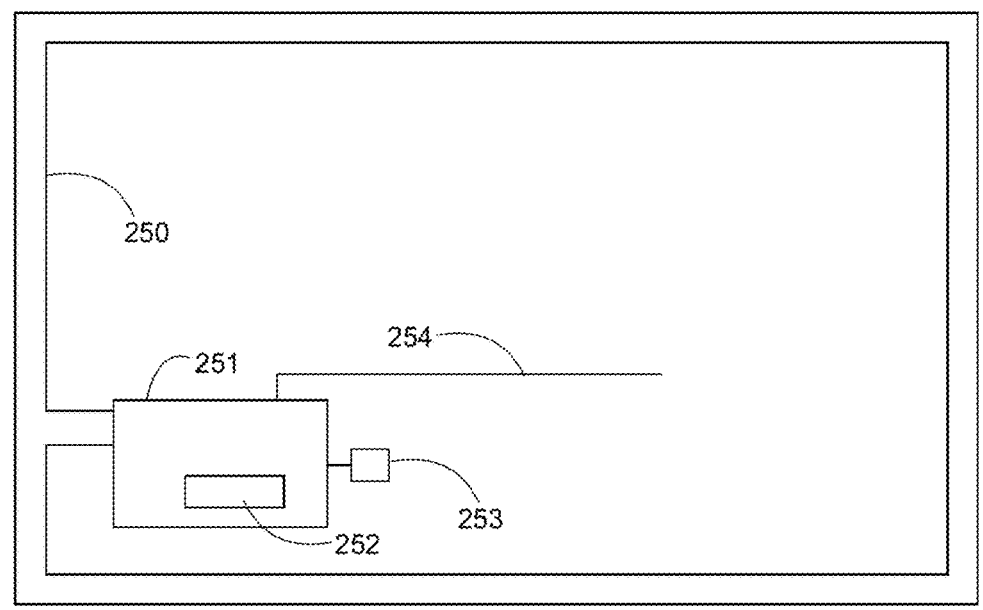
FIG. 8 shows the chassis intrusion detector operating principle.

FIG. 8 illustrates that the chassis intrusion detector (CID) can contain its own microprocessor security assembly 251 and battery 253, or they can be located on the PCB 22. The CID can also contain its own RAM memory 252. The RAM memory 252 can contain the private key and other private information which is kept alive by the battery 253. The battery 253 is chosen such that it can provide sufficient power to maintain the RAM memory 252 active for several years and also provide power to the microprocessor security assembly 251 to monitor the wire labyrinth. The conductive wire is attached to the microprocessor which checks impedance of the wire. Any change in impedance detected by the microprocessor is indicative of an attempt to intrude into the interior of the electronics and sensors assembly. If such intrusion is detected, power is removed from the RAM memory 252 and the private information is erased.

A schematic of the chassis intrusion detector is shown in FIG. 8. Power is supplied from an external computer though connection 254 leading to the USB connector 25 of FIG. 3. Connection (wire) 254 also provides communication from the electronics and sensors assembly of which the security assembly is a part. The fine wire maze is shown at 250, the security assembly (SA) at 251, the long life battery at 253 and the RAM memory at 252. Security assembly (SA) 251 can be a separate subassembly which is further protected by being potted with a material such that any attempt to obtain access to the wires connecting the battery 253 to the microprocessor therein or to the RAM memory 252 would be broken during such an attempt. This is a secondary precaution since penetration to the SA 251 should not be possible without destroying the private information.

To summarize, any disruption of the mesh will destroy the private key and other private information making it impossible to decode the test questions. After the assembly of the device 20 is completed, the microprocessor can be powered on and the first step would be to measure the inductance, resistance, and capacitance, as appropriate, of the mesh of wires 35, 36. If any of these measurements significantly change, the circuit in the SA 251 would remove power from the RAM memory 252 thereby destroying the private information. Since the private information cannot be reloaded, the assembly would need to be returned to the factory for remanufacture and the insertion of a new SA 251 or entire electronics and sensors assembly.

Figure 9:
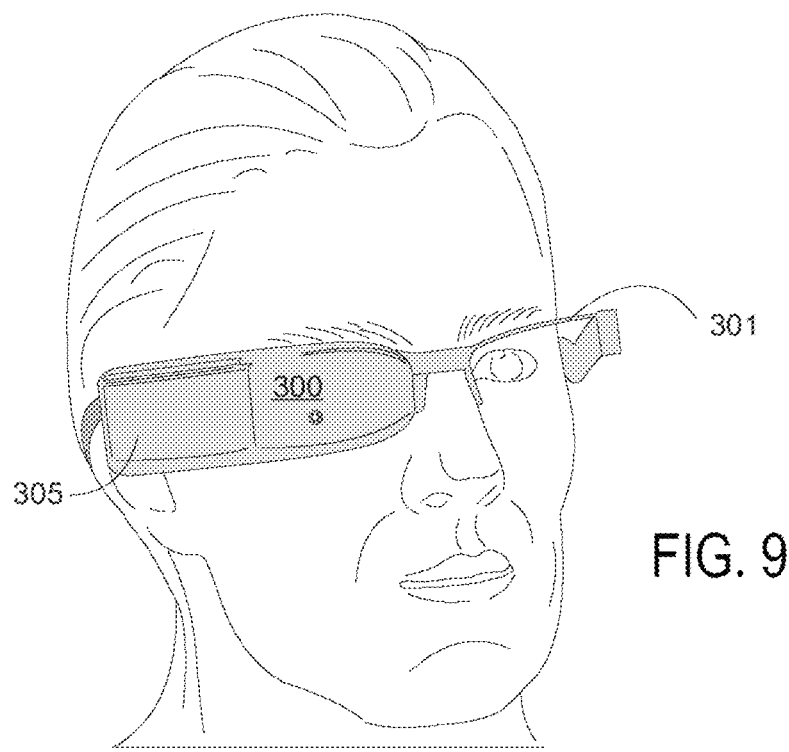
FIGS. 9 and 10 illustrate a monitor device when worn by a person.
Figure 10:
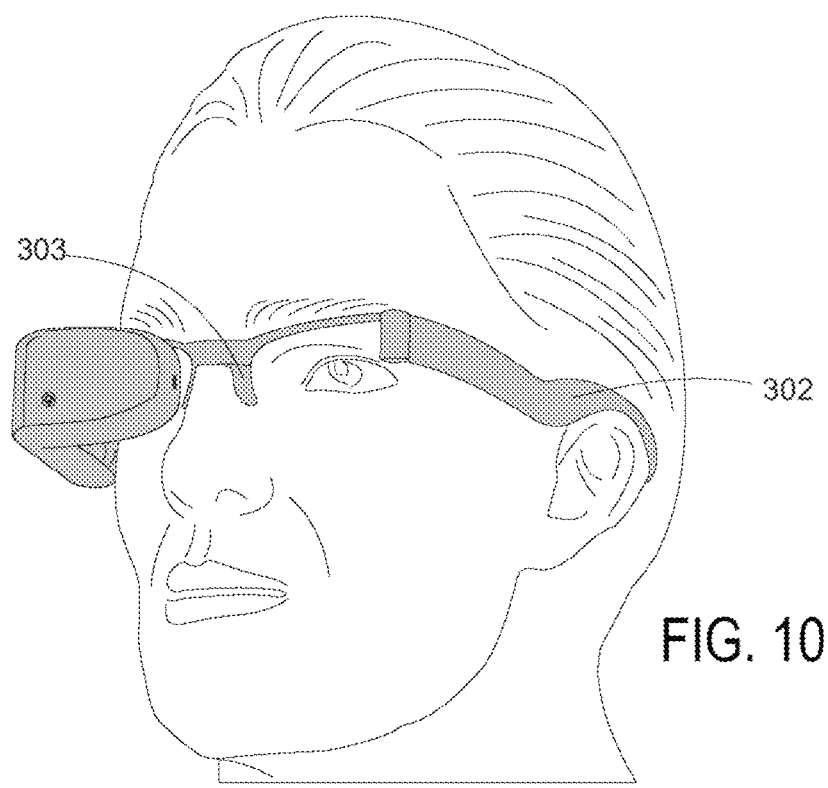

FIGS. 9 and 10 show another version of a monitor, device 300 with a frame 301 on the person (without lens). A USB connector should snap into a housing 305 before the housing 305 is closed. A variant of the nose pad 303 and temple 302 are shown in FIG. 10.

Figure 11:
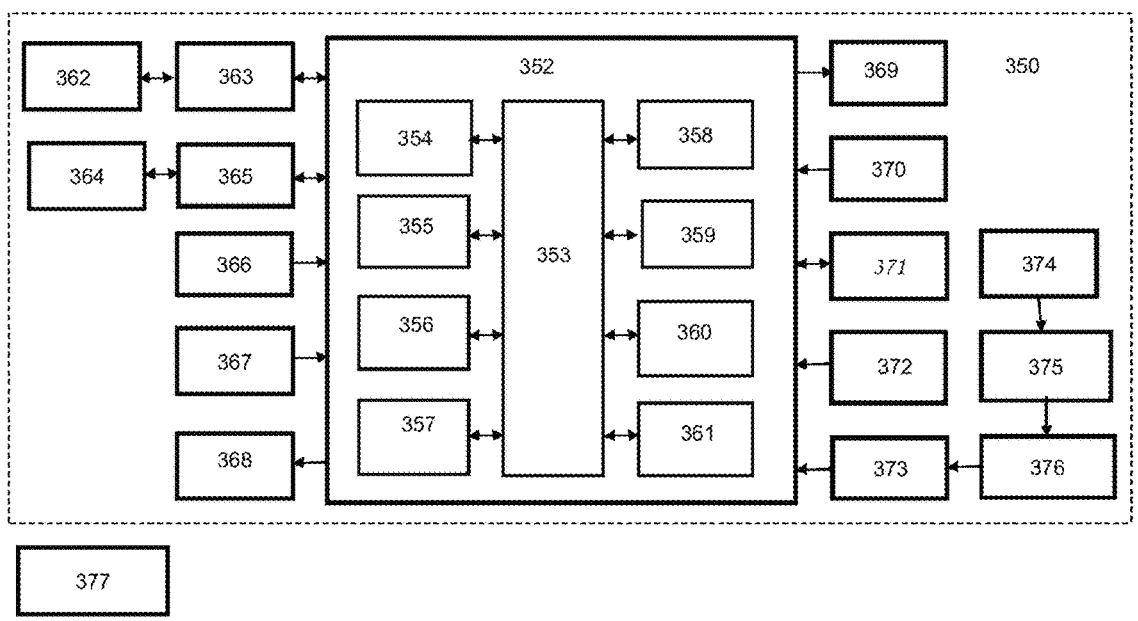
FIG. 11 illustrates a monitor block diagram.

A representative device block diagram is illustrated in FIG. 11. The device is represented generally as 350 and typically comprises a (micro)processor generally at 352 which further can comprise a CPU 353, a display interface 354, an iris camera interface 355, a forward view camera interface 356, a cross view camera interface 357, an eMMC 358, RAM 359, a communication interface 360, a LED control interface 361, a display optical interface 362. Also in the device 350, there can be a display 363, an iris camera optical interface 364, an iris camera 365, a forward view camera 366, a cross view camera 367, a iris camera LED 368, a buzzer or other sound maker 369, a microphone 370, a Wi-Fi module 371, a mouse/keyboard interface (bluetooth) 372, a battery 373, a CID battery and mesh 374, a CID controller 375, a data and charger interface 376 and an optional external camera Wi-Fi interface 377.

Figure 12:
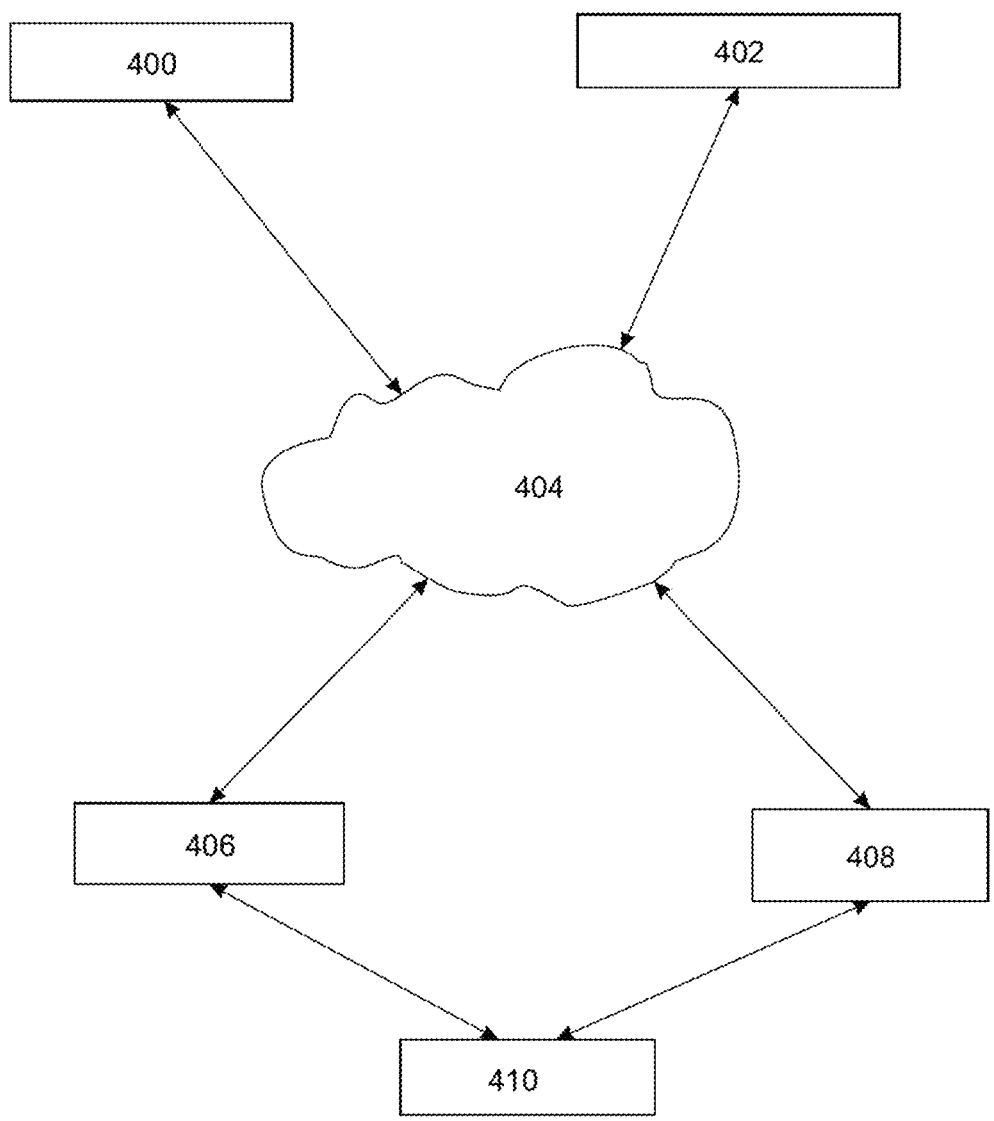
FIG. 12 illustrates a system block diagram.

A system block diagram is shown in FIG. 12 and can comprise a server 400, a Test-Provider or test-providing institution 402, a communications network 404, one or more monitors or devices 406, a computer 408 and the user 410.

Figure 13:
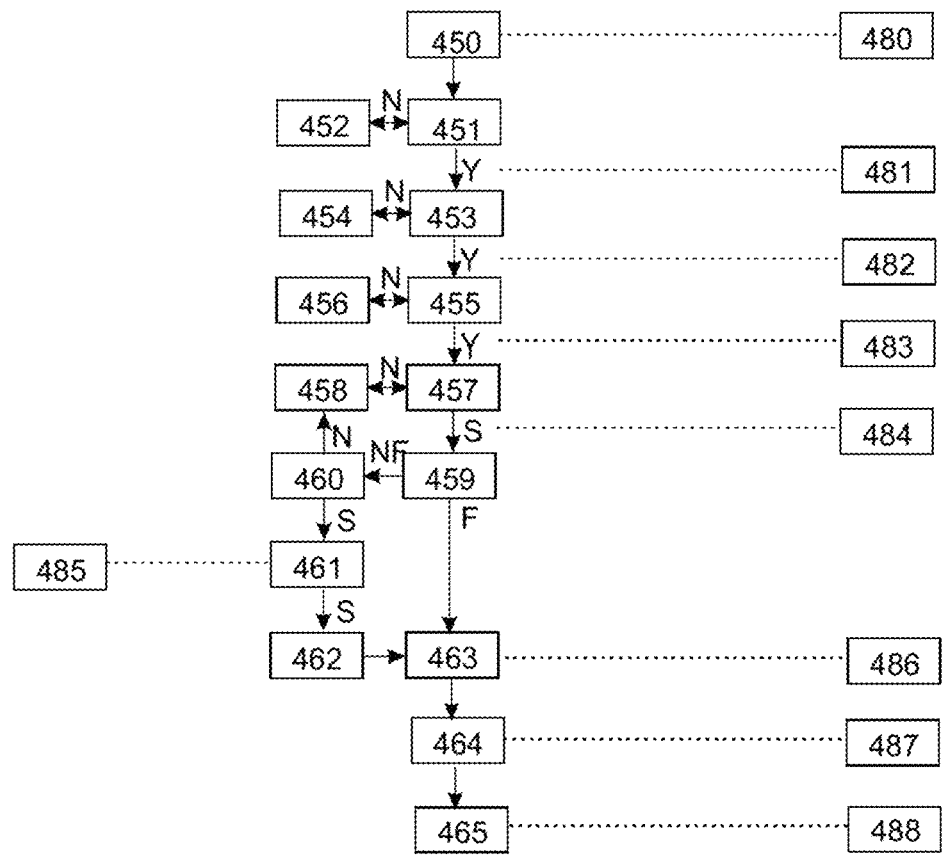
FIG. 13 illustrates a representative administrative sequence.
Figure 14:
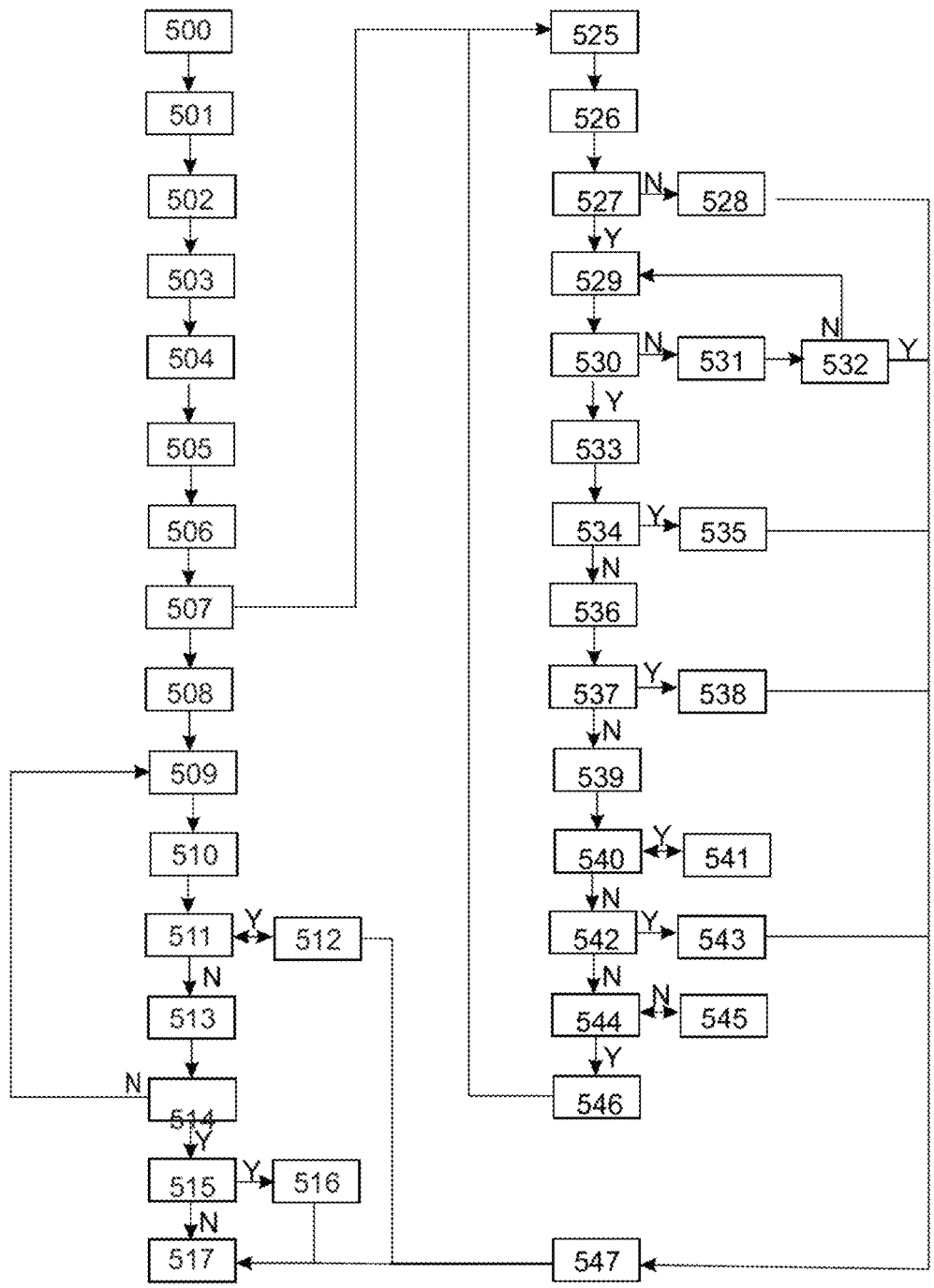
FIG. 14 illustrates a representative test-taking sequence.

An administrator flow chart is illustrated in FIG. 13 and can comprise the following steps (not all are required):
  450 User plugs in monitor
  451 Mouse connects
  452 Mouse setup
  453 Wi-Fi connects
  454 Wi-Fi setup
  455 Iris scan
  456 Wait
  457 Web call
  458 Troubleshoot
  459 Get name
  460 Web call
  461 Send iris digital image and Monitor/Device ID
    Server returns iris code to Monitor/Device
    Monitor/Device creates cryptographic key set based on iris code and proprietary algorithm
    Monitor/Device sends public key to server
  462 Iris, Monitor/Device codes and user public key linked with user and added to list on server
  463 Test-taker authenticated
  464 Choose test to take
  465 Proceed to test-taking sequence
  480 Display "Power is on"
  481 Display "Mouse connected"
  482 Display "Wi-Fi connected"
  483 Display "Iris scanned"
  484 Display "web call successful"
  485 Display random number e.g. "234 342 907 enter using login computer"
  486 Display "Welcome Ann Smith"
  487 Display list of user's available tests
  488 End of login sequence When this is accomplished, a signal can be sent to the server indicating that the test-taker is ready to take the examination. A representative test-taking sequence is illustrated in FIG. 14 and can comprise the following steps (not all are required):
  500 User selects test to take
  501 Web server obtains test from the test-provider
  502 Monitor/Device creates cryptographic key set based on iris code and proprietary algorithm
  503 Web server obtains public key from file
  504 Web server processes and encrypts test using Monitor/Device public key
  505 Encrypted test is transferred to Monitor/Device using https:
  506 Monitor/Device decrypts test using its private key
  507 Start test monitoring
  508 Start test timer and initialization of other parameters (pupil, # of pauses etc.)
  509 Monitor/Device displays next test question
  510 User chooses multiple choice answer using mouse which is recorded
  511 Has allotted time been exceeded?
  512 Display "maximum test time exceeded"
  513 User advances or goes back to another question or indicates test is done
  514 Is user done taking test?
  515 Has pupil change flag been set?
  516 Send warning message to server "possible fake iris contact lens in use"
  517 Display "End of test", transfer test answers to server, stop monitoring
  525 Start test monitoring tasks 526 Acquire iris image—flash white LED
527 Compare iris image with memory
528 Display "Iris has changed, unrecoverable error"
529 Acquire eye location image, measure pupil diameter and set flag if pupil diameter has changed
530 Is eye located properly and has pupil diameter changed
531 Display "eye location error, test paused, right click to restart"
532 Increment pause counter, check for maximum pauses and sense right click
533 Acquire cross-view camera image
534 Analyze cross-view camera image for anomalies
535 Display "cross-view image contains an anomaly, unrecoverable error"
536 Acquire forward view camera image
537 Analyze forward view camera image for anomalies
538 Display "forward-view image contains an anomaly, unrecoverable error"
539 Activate buzzer
540 Acquire and analyze sound interval from microphone
541 Display "warning sound from microphone contains an anomaly"
542 Acquire interval of sound from bone microphone
543 Display "User is talking, unrecoverable error"
544 Acquire and analyze interval of heartbeat data from blood flow monitor
545 Display "bone microphone not in contact with cheek bone"
546 Wait 1 second and then Continue
547 Display "Test terminated on error"
548 End of test (after 517)

When the test-taker engages in taking a second test later, a new biometric scan will be conducted to ascertain that this is the same person who originally registered using device 20. If this scan comparison is successful, then the display 27 will be activated and a signal can be sent by the processor to the test-provider to forward the encrypted test.

There are various sensors including the forward-looking camera, the iris imaging camera, the cross-view monitoring camera, and the microphone, that provide data which contain patterns which are appropriate for neural network analysis. In some cases, initially this analysis can be simplified by using differences between two images. For example, for the cross-view camera which monitors the space from the eye-to-display monitoring camera, it is expected that the image of this should be invariant and therefore any significant changes in that image would be indicative of an anomaly which should be brought to the attention of the test-taker for remedial action. Similarly, once the test has begun, there should be no voices sensed by the microphone 24 and therefore if any voice frequencies are present the anomaly can be highlighted for remedial action by the test-taker. This lack of sound requirement may be difficult to enforce so a bone microphone 38 is provided to detect whether the test-taker is talking. If this talking is detected, the test can be interrupted and if it happens a second time, the test can be terminated.

Eye image analysis to detect that the eye is properly located in the FOV of the iris camera can be somewhat more complicated, however, again since it is the difference between two such images which is significant, the analysis can be relatively uncomplicated. Iris identification biometric software is commercially available and does not impose a significant problem. In order to guard against use of a contact lens with a painted surface showing an invariant iris image to an iris imaging camera, the size of the pupil is monitored by the device 20 via pupil image analysis. The pupil diameter changes over time even when the background lighting level is invariant. Therefore, if by the end of the test, the pupil has not changed in diameter such a painted contact lens is suspect and can be flagged as an anomaly.

Figure 15:
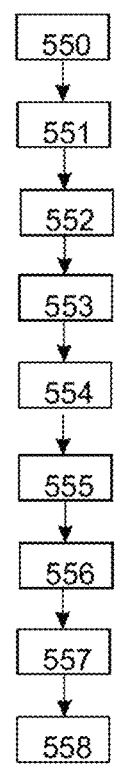
FIG. 15 illustrates a representative biometric block diagram.
Figure 16:
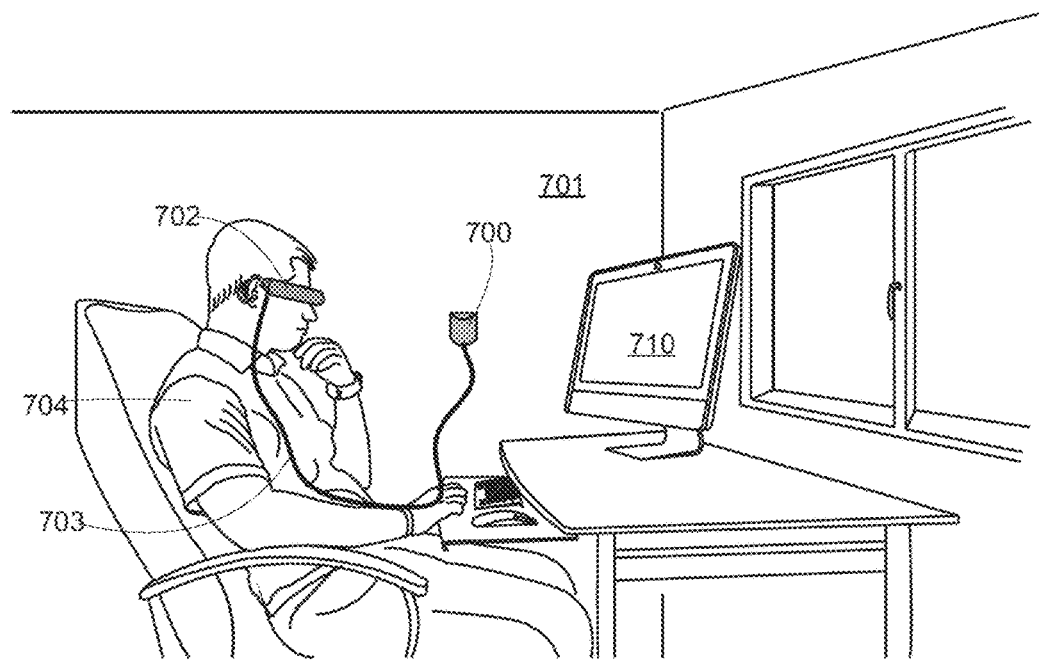
FIG. 16 illustrates a monitor connected to a power and Wi-Fi module which plugs into wall.

A representative device assembly sequence is illustrated in FIG. 15 comprising the following steps (not all are required):

550 Assemble parts
551 Place CID in fixture
552 Place electronics and optics in fixture
553 Apply adhesive to display lens, camera lenses, bone microphone, heartrate monitor and CID edges
554 Close fixture
555 Wait for adhesive to set
556 Remove assembly with CID from fixture
557 Place in housing
558 Snap housing together FIG. 16 shows a Wi-Fi module 700 plugged into a wall 701 via a connector 703, and it can also be a charger for device or monitor 702. This can be a strong recommendation of using the device 702 to avoid its discharge. A test-taker 704 is taking a test using a display 710.

Figure 17:
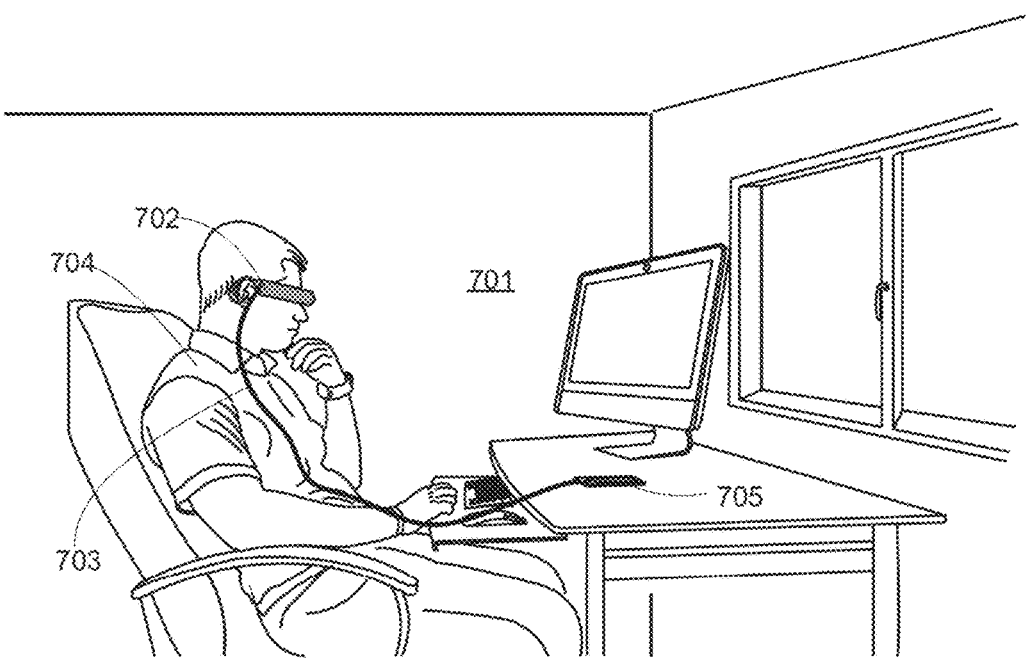
FIG. 17 illustrates a situation where the monitor plugs into a smartphone.

FIG. 17 illustrates a situation, like FIG. 16, but where the device 702 plugs into smartphone, PC or tablet 705. This can be a strong recommendation of using the device to avoid its discharge.

Figure 18:
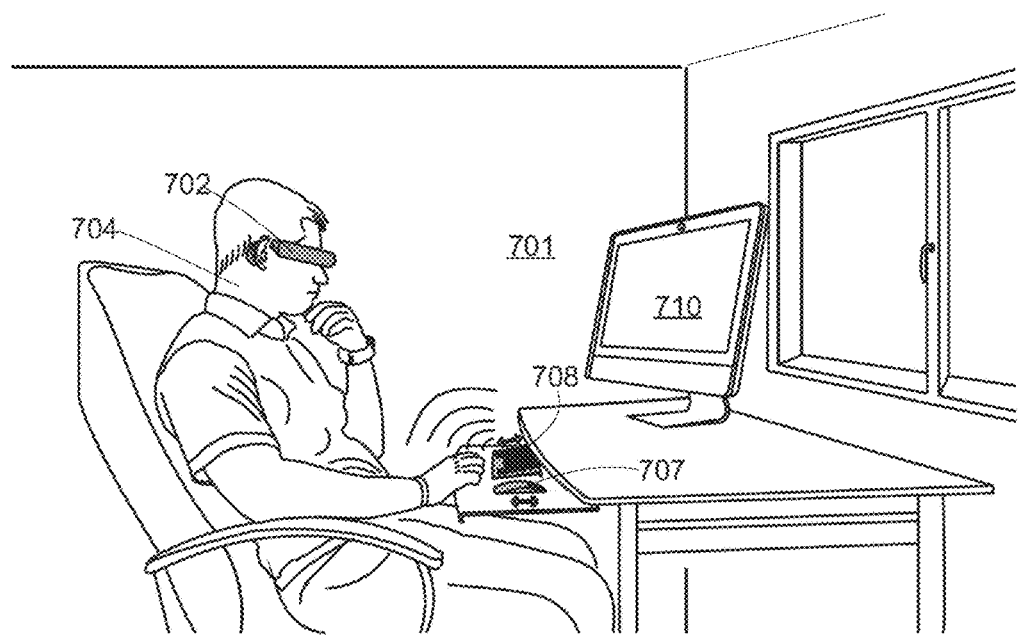
FIG. 18 shows the monitor with associated mouse and keyboard.

The connection between the device 702 and mouse 707, keyboard interface 708 is illustrated in FIG. 18 with the following features:

a. The device 702 is started when mouse 707 or keyboard 708 is activated.
b. A mouse 707 or keyboard 708 can be used to control the display 710, Internet connection, etc.
c. Other devices can also be controlled using the mouse 707 or keyboard 708 but are not discussed here.

A test-taker can have access to a keyboard 708 and/or a mouse 707 for interacting with this server for initial registration (FIG. 18). Using a mouse 707 or keyboard 708, the test-taker initiates the test-taking process through communication with the test-provider or their institution's server (see FIG. 12). When the test is ready for execution by the test-taker, and encrypted version of the test is transmitted to the device 702 (from the server via a network, see FIG. 12). The electronics package in the housing of the device includes a (micro)processor which can utilize a private decryption key to decrypt the test questions and cause them to be displayed on display 710 as described herein. The test-taker can then enter the answers to the questions using the mouse 707 or keyboard 708 or other user interface.

Some precaution may be required in the case where a keyboard 708 is used to prevent the test-taker from using the keyboard 708 to communicate with a consultant. Keyboard 708, for example, may have a hidden switch that disconnects it from the device 702 and connects it to the consultant. The device 702 will know through the forward-viewing camera that the test-taker is entering information via the keyboard 708 and if that information is not detected by the device 702 through the keyboard interface, then communication to the consultant may be taking place and the test can be terminated or other appropriate remedial action taken.

Figure 19:
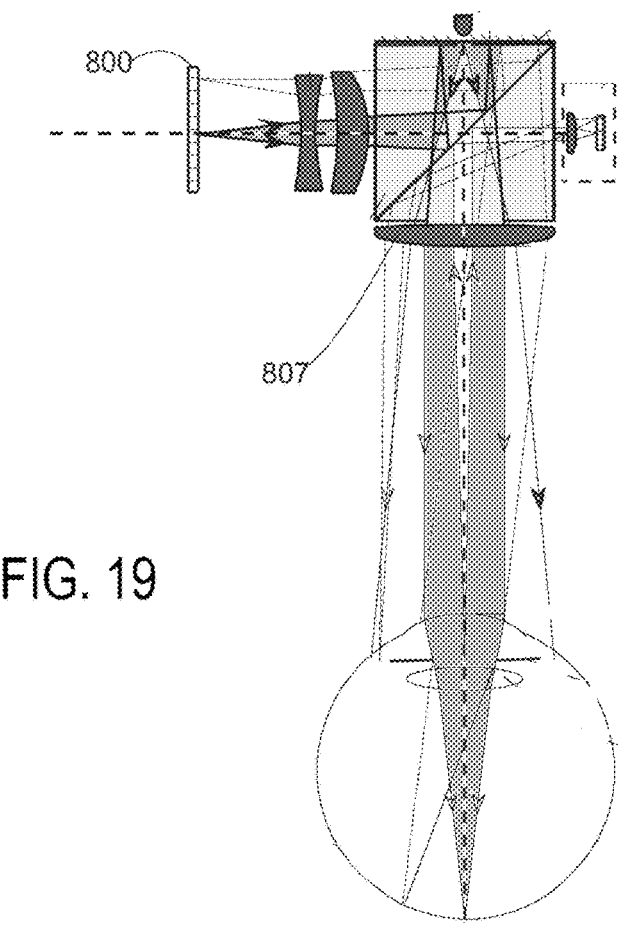
FIG. 19 illustrates an optics detail showing one method of nearsightedness and farsightedness adjustment and nose rest adjustment.

FIG. 19 shows details of the optics used in the device 20 (or other similar device disclosed herein), and unless specifically addressed, are common optical components whose function is known or readily ascertainable by those skilled in the art to which this invention pertains.

Adjustment for nearsightedness and farsightedness can be accomplished, for example, through moving a display 800 or a lens 807, both of which are covered by the CID (like display 27 covered by CID 22). If the position of the display 800 is used, then it should be positioned during assembly and prior to the application of the CID 22 or an adjustment mechanism would have to protrude through the CID 22. In the former case, the devices would need to be manufactured fitting different test-takers which would thus require several categories of devices to be stockpiled and it would also limit the general use of a device 20 by several test-takers. If an adjustment mechanism is provided, the integrity of the CID 22 is compromised which may allow a path to the inside of the device where the contents of the display 800, for example are captured and transmitted to the consultant.

In the second case, the lens 807 can be left outside of the CID 22 making it easy to use for eyesight adjustment. In this case, however, the focal point of the iris camera would also change since it goes through the same lens. A self-focusing camera could be used for the iris camera to solve this problem or a lens system with a high f-stop yielding a long focal distance could be used. Alternately, the iris camera can be placed such that it does not go through the lens 807 by placing it below or to the side of the display optics.

Figure 20:
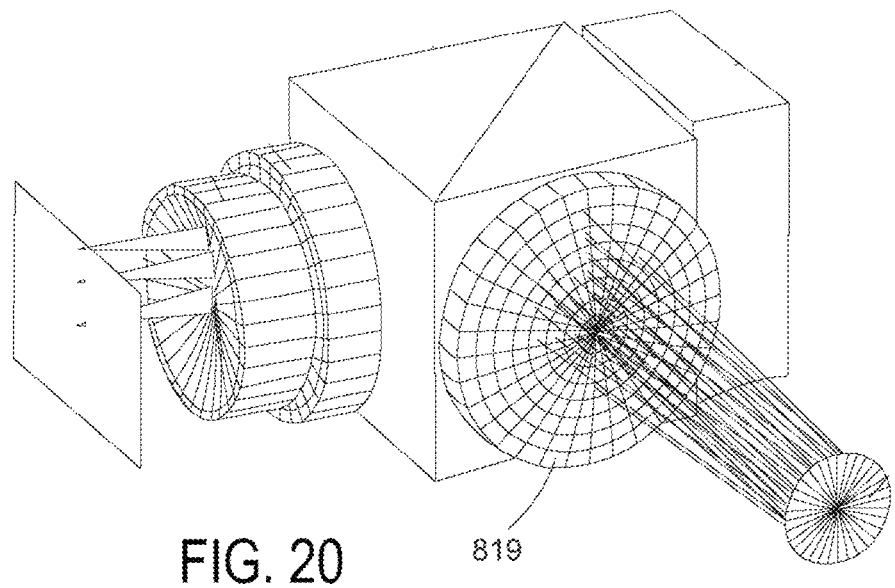
FIG. 20 is a 3D-diagram of the display and iris-scanner module.

FIG. 20 is a 3D-diagram of the display and iris-scanner module. The LED is not shown here. It is arranged along the axis lens 819 at the opposite plane of the cube beamsplitter, see FIG. 19.

Figure 21:
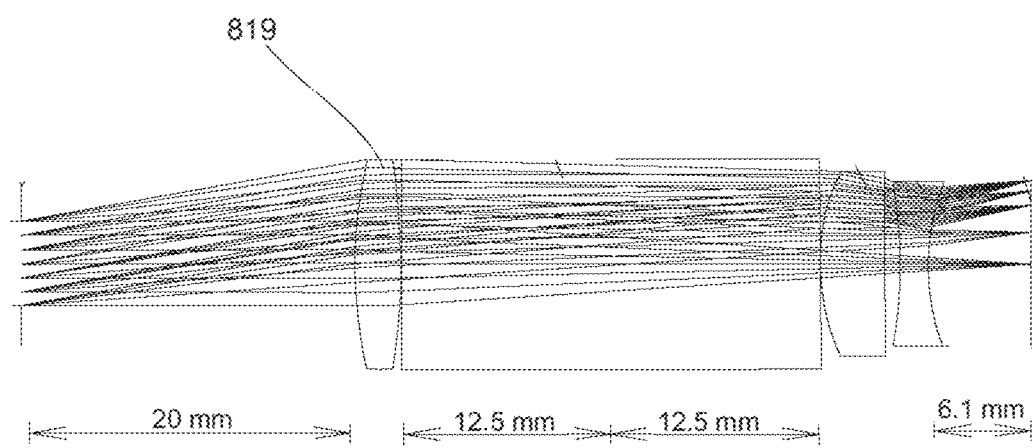
FIG. 21 illustrates the ray path in the display channel.

FIG. 21 shows a ray path in the display channel (shown at a linearized in the reverse direction).

Figure 22:
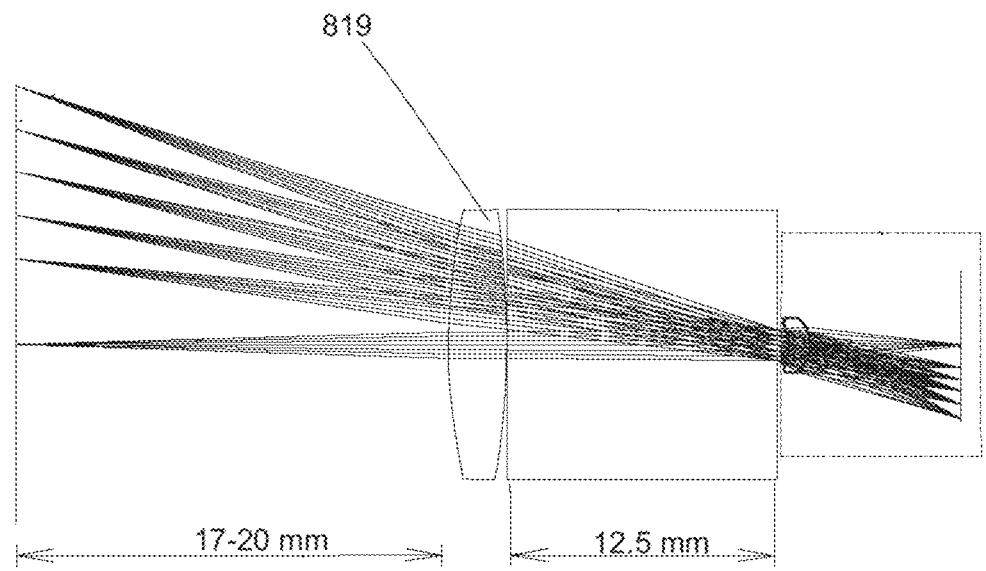
FIG. 22 shows the ray path for the iris-scan camera.

FIG. 22 shows the ray path in the iris-scan channel (shown at a linearized scheme in the forward direction).

Figure 23:
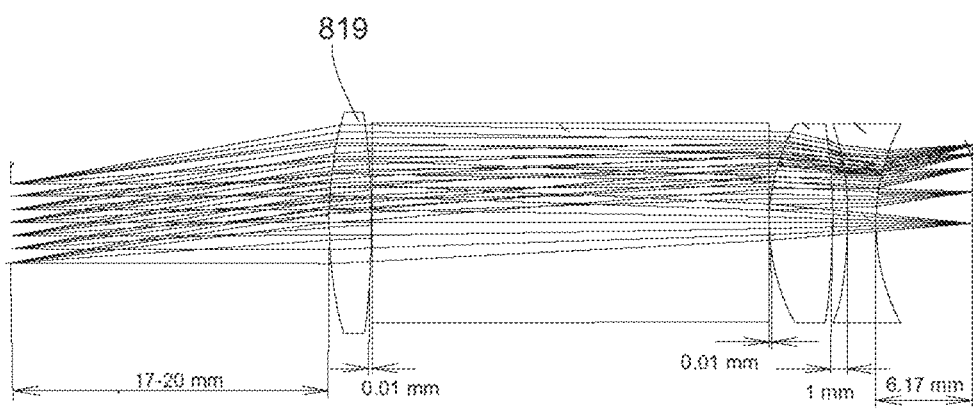
FIG. 23 is a lens prescription data.

FIG. 23 shows lens prescription data.

TABLE 1

| Lens # | First radius, mm | Second radius, mm | Thickness, mm | Glass | Light zone Diameter, mm | Lens Diameter, mm |
|---|---|---|---|---|---|---|
| 1 | 25.726 | −50.16 | 2.7 | N-PK51 | 12.5 | 14 |
| 2 | 12.75 | −44.508 | 4 | N-PSK53 | 11 | 12.5 |
| 3 | −21.428 | 13.046 | 1.7 | N-SF4 | 10 | 12.5 |

FIG. 24 is an alternate frame design including a plastic headband 900 connected to a housing 903 (like housing 21), and it can be also be in the form of elastic band for better fixing the device on the test-taker's head, i.e., end 904 is connected to the glasses 910 (not shown). A USB cable connected to the device is shown as 901 in FIG. 24.

FIGS. 25 and 26 show another variant of glasses rim 910. A see-through lens as with ordinary vision correction glasses is shown as 911, but the device can be without such a glass lens.

An objective of the test-taking system of this invention is that it is completely automatic without requiring the intervention of any human other than the test-taker 10 (FIG. 1). The institution administering the test will have a limited set of rules which, if violated, will render the test invalid. These rules can be general rules or rules specific to the test being taken. These rules can include: the events which will invalidate a test; the number of times that the test, once an event has occurred, can be restarted if any; the number of times that a particular test can be taken if failed; the time permitted to take the test; the number and length of pauses permitted during the test-taking process; etc. Some or all of the rules may or may not be communicated to the test-taker 10.

This puts a small burden on the institution to determine what constitutes cheating and the consequences. This is a relatively light burden with the test-taking apparatus of this invention, the Monitor, since once the rules have been set the opportunities for an undetected violation of these rules are very limited or nonexistent.

A substantial number of sensors have been introduced, each of these sensors requires an algorithm to assess the sensor output and determine whether the test-taker is cheating or not. Since the Monitor is provided with a chassis intrusion detector (CID), as discussed herein, it is virtually impossible for a consultant to modify the apparatus to transmit the display information to another room, for example. With a CID, there are no accessible wires which connect the display to the electronics package, for example.

Finally, the display itself is protected. The test-taker 10 can wear a camera which has a lens the size of a small pea but for that camera to see the display, it will also be seen by the iris imager or the eye-to-display cameras since there is a very limited viewing area for the camera to see the display.

Of course, if a cheating method is discovered, it will quickly become public through the Internet, defeating the Monitor solution. Therefore, a continuous improvement process which rewards test-takers who discover cheating methods can be implemented.

At the discretion of the institution, a time limit or no time limit can be afforded the test-taker 10 for completing the test. Similarly, a course can have only a single final exam or a series of quizzes in addition to a midterm and final exam or feedback can be requested from the test-taker 10 during each course session depending on the course and the desires of the institution. Since all such tests will be graded automatically, the cost of having daily or more frequent quizzes versus a single final exam is insignificant. In one extreme case, all the required courses can be given without any exams and a final comprehensive exam can be used to validate a student for receiving a degree. Alternately, the student can be tested continuously during the course or degree process without any final examinations. These decisions are left up to the institution. These options are facilitated due to the ability of the student to observe instructions presented on the computer or Monitor screen and at arbitrary times be tested using the Monitor.

The student can enter data into the testing program through the keyboard 708 (FIG. 18), a track pad (not shown), and/or the mouse 707, or any other type of user interface such as a touch screen of a laptop computer or smartphone 705 (see FIG. 17) when the device is connected thereto. The mouse 707 or keyboard 708 can be attached to a smartphone or computer 710 with a fixed wire or wirelessly.

Various biometric technologies for verifying the identity of the test-taker for use with the inventive device will now be discussed. Since the inventive device is mounted on the head in front of the eyes of the test-taker, the most readily available biometrics are images of the eyes or facial tissues surrounding the eyes. A variety of different biometric tests can be devised, but the most common are retina and iris images. Both are available using a camera mounted in conjunction with the display. The retinal image is used to examine the pattern of blood vessels at the back of the eye. Although retinal patterns may be altered in cases of diabetes, glaucoma or retinal degenerative disorders, the retina typically remains unchanged from birth until death. Due to its unique and unchanging nature, the retina appears to be the most precise and reliable biometric, aside from DNA.

Advocates of retinal scanning have concluded that it is so accurate that its error rate is estimated to be only one in a million. The blood vessels within the retina absorb light more readily than the surrounding tissue and are easily identified with appropriate lighting. A retinal image is obtained by casting an unperceived beam of low-energy infrared light into a person's eye as they look through the imaging eyepiece. This beam of light traces a standardized path on the retina. Because retinal blood vessels are more absorbent of this light than the rest of the eye, the amount of reflection varies during the scan. The pattern of variations is converted to computer code and stored in a database.

The iris scan is an automated method of biometric identification that uses mathematical pattern-recognition techniques on images of the irises of an individual's eyes, whose complex random patterns are unique and can be seen from some distance. Not to be confused with other, less prevalent, ocular-based technologies, retina scanning and eye printing, iris recognition can use camera technology with subtle infrared or visible illumination to acquire images of the detail-rich, intricate structures of the iris externally visible at the front of the eye. Digital templates encoded from these patterns by mathematical and statistical algorithms allow identification of an individual. Billions of people in several countries around the world have been enrolled in iris recognition systems, for convenience purposes such as passport-free automated border-crossings, and some national ID systems based on this technology are being deployed. A key advantage of iris recognition, besides its speed of matching and its extreme resistance to false matches, is the stability of the iris as an internal, protected, yet externally visible organ of the eye.

Both images are extremely accurate and very difficult to fake. Since the apparatus for conducting these scans is protected by the chassis intrusion detector, they are the preferred biometric identification systems for use with this invention. Although it has been proposed that secure testing systems utilize more than one biometric identification parameter, accuracy of either of the retinal or iris images is so high as to eliminate the need for a second biometric identification parameter. The iris scan is somewhat easier to implement and therefore is the preferred system for use with this invention.

Since it is possible that an iris image can be faked though printing of such an image on to a contact lens, as a precaution, the size of the pupil can be monitored over time. It has been found that the pupil size changes continuously even under constant illumination, and therefore it can be monitored to check for a painted contact lens.

There has been considerable discussion as to where the biometrics of a person are stored. If the iris image, for example, is transmitted and stored at a university, and the image is stolen, the thief might be able to make nefarious use of the data. In the invention herein, the iris image is acquired by the inventive device and sent encrypted to a server (not shown). The server then encodes the image forming an iris code. That code is encrypted and sent to the inventive device. The inventive device then applies a proprietary algorithm to convert the code into a test-taker ID. The process also creates a cryptographic key set which is used by the server to encrypt all tests sent to the Monitor. Since these tests are sent using the Https: protocol, the tests are double encrypted. Once the student ID and key set are created, the iris code is erased as is the iris image on the server. Thus there is no stored biometric data for the test-taker.

When the server gets the student ID, it can scan its database to see if the student has a prior registration. If not, then the registration process can be initiated using a computer available to the student. The computer can access the server and the server can send a random number to the inventive device which the test-taker can type into the computer thereby linking the monitor to the logged-in computer. When the test-taker then enters his/her registration information, it can be combined with the student ID, public key and Monitor ID. Since the inventive device used by the student can change, a record can be retained of the inventive devices which the student (test-taker) has used. On a subsequent login, the student's ID will be calculated from the iris code above and linked to the student's record without the need for input from a computer.

Some important features of this invention differentiate it significantly from prior art attempts to develop secure testing systems. These include:

1. Use of a head-mounted display for presenting randomized questions to the test-taker in a manner that questions cannot be obtained or observed by another person. Such a display can be in the form of a small light emitting display held near the eye of the test-taker.
2. The same test is given to multiple students wherein the order of the tests questions is randomized to prevent passing of answers from one student to another. Each student can take the identical test but the questions are ordered differently.
3. The test-taking process is fully automatic and does not require human intervention. If the test-taker violates rules of the institution, the violation will be noted and provided to the test-taker. The institution will only get involved if the test-taker protests the results.
4. No video or audio data is forwarded to the test-taking institution. If the test was successfully completed, it is assumed that no cheating occurred. If the test is interrupted, diagnostic information can be retained and upon request of the institution, forwarded thereto for diagnostic purposes. In general, neither video nor audio information is stored during the test-taking process unless the test is interrupted.
5. No behavioral measurements are made, recorded, or sent to the institution and thus it is not necessary to try to interpret cheating activity based on behavioral or other measurements.
6. Test questions are only available to the display which are part of the inventive device and protected using strong encryption and by the chassis intrusion detecting system.
7. Since it is virtually impossible for a consultant to observe a copy of the test, attempts to determine that a consultant is communicating with the test-taker other than by oral communications are unnecessary. Such communications from the consultant are impossible to reliably detect. Oral communications from the test-taker are forbidden and if detected by a contact microphone, for example, the test can be stopped.
8. The test encryption and decryption key set is created by the inventive device using a secret algorithm based on the iris code determined by the server. At the end of the test, the private key is destroyed. Since the only copy that exists is on the inventive device and protected by the chassis intrusion detector, no other device can decrypt the test which has been created by the test-providing institution uniquely for the inventive device.
9. Use of sophisticated neural network-based pattern recognition algorithms allow for continuous improvement of this system if and when new cheating methods are discovered. This allows for upgrading the software of the system as new improvements are implemented.

Disclosed herein are a series of measures that are designed to prevent the transfer of test-related information to anyone other than the test-taker by any means either visually, electronically, or wirelessly. Measures disclosed herein are not exhaustive and the intent of this invention is to cover preferred implementations of such techniques. Similarly, disclosed herein are a series of measures to prevent information from being transmitted to the test-taker on the assumption that the information about the test has leaked to a consultant. Since the consultant now must transmit to the test-taker information which will affect how the test-taker answers the question, this invention has also not exhaustively disclosed all possibilities of information transferal from the consultant but only representative cases.

It is not the intent of the inventors to cover all such transferal means including, for example, haptic methods which have not been discussed above. These include, for example, a wire attached to the test-taker and physically held by the consultant who may in fact be in another room wherein the wire travels through a hole in a wall. In this case, for example, if the consultant knows the test question and has determined that the proper answer is 3 then the consultant could pull three times on the wire thereby transmitting this information to the test-taker. All sorts of similar haptic techniques exist including electrically actuated vibrators, spark creators etc. To cover all such possibilities of either the leaks of information out of the test-taking device or the communication of information to the test-taker would require volumes. Thus, it is the intent of the inventor to cover all such possibilities while disclosing those that are most readily implemented.

Finally, all patents, patent application publications and non-patent material identified above are incorporated by reference herein. The features disclosed in this material may be used in the invention to the extent possible.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A secure testing system; comprising:
    an eyeglass frame having a lens portion and a support portion extending rearward from said lens portion;
    a housing attached to one side of said frame;
    an assembly arranged in said housing; and
    a chassis intrusion detector arranged in conjunction with said housing to detect an attempt to intrude into said housing,
    said assembly comprising:
        a display oriented rearward;
        a cross-view camera oriented to image toward opposite side of said frame;
        at least one microphone arranged on said frame to detect sound in an environment around said frame;
        a biometric sensor arranged on said housing to obtain biometric data; and
        a processor that causes display of questions on said display, monitors images from said cross-view camera for changes indicative of a possibility of reception of assistance, monitors said at least one microphone for sounds, and monitors said biometric sensor for a change in biometric data.

2. The system of claim 1, wherein said at least one microphone comprises a bone microphone.

3. The system of claim 1, further comprising an embedded skin temperature sensor that obtains temperature of skin when said at least one microphone is in contact with skin.

4. The system of claim 1, further comprising a blood flow sensor that obtains data about blood flow when said at least one microphone is in contact with skin.

5. The system of claim 1, further comprising a pair of EKG sensors that obtain measurements of heart beat shape when said at least one microphone is in contact with skin.

6. The system of claim 1, further comprising a sound generator coupled to said processor and that generates sound to enable said processor to analyze whether said at least one microphone receives an expected sound when said sound is generated by said sound speaker.

7. The system of claim 1, further comprising a forward-looking camera oriented to image forward of said frame.

8. The system of claim 1, wherein said biometric sensor comprises an iris or retinal scan camera oriented to image rearward.

9. The system of claim 1, wherein said frame includes an aperture in said lens portion on an opposite side of the housing from the side to which said housing is attached.

10. The system of claim 9, further comprising a see-through lens received in said aperture.

11. The system of claim 10, further comprising an adjustment mechanism that adjusts said lens based on eyesight of a wearer of the system.

12. The system of claim 1, wherein said housing is substantially L-shaped having one portion alongside said lens portion and another portion alongside said support portion.

13. The system of claim 1, wherein said chassis intrusion detector comprises a mesh of wires around said housing and coupled to said processor, said assembly including a memory component containing data essential for taking a test using the system, said processor monitoring changes in resistance, capacitance and/or inductance of a circuit including said wires and deleting or preventing access to data in said memory component when a change in the resistance, capacitance and/or inductance of the circuit is detected.

14. The system of claim 1, further comprising a connector port on said housing.

15. The system of claim 14, further comprising a charger that plugs into a charging outlet and a cable connected at one end to said charger and at an opposite end to said connector port.

16. The system of claim 1, further comprising at least one user interface that controls said processor to initiate sequential presentation of test questions and enable reception of answers to test questions.

17. The system of claim 16, wherein said at least one user interface comprises a mouse.

18. The system of claim 16, wherein said at least one user interface comprises a keyboard.

19. The system of claim 1, further comprising an adjustment mechanism that adjusts said display based on eyesight of a wearer of the system.

20. The system of claim 1, wherein said support portion comprises a flexible, elongate headband connected at each end to said lens portion.

* * * * *